US009999827B2

United States Patent
Wood

(10) Patent No.: US 9,999,827 B2
(45) Date of Patent: Jun. 19, 2018

(54) SELF-BALANCING SKATEBOARD WITH STRAIN-BASED CONTROLS AND SUSPENSIONS

(71) Applicant: Future Motion, Inc., Santa Cruz, CA (US)

(72) Inventor: Daniel J. Wood, Camas, WA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days. days.

(21) Appl. No.: 15/793,892

(22) Filed: Oct. 25, 2017

(65) Prior Publication Data
US 2018/0111039 A1  Apr. 26, 2018

Related U.S. Application Data

(60) Provisional application No. 62/412,817, filed on Oct. 25, 2016.

(51) Int. Cl.
*A63C 17/12* (2006.01)
*B62K 11/00* (2006.01)
(Continued)

(52) U.S. Cl.
CPC ............ *A63C 17/12* (2013.01); *A63C 17/016* (2013.01); *A63C 17/223* (2013.01); *A63C 17/226* (2013.01);
(Continued)

(58) Field of Classification Search
CPC ....... A63C 17/12; A63C 17/226; A63C 17/26; A63C 17/223; A63C 17/016; B62K 11/007; G01P 15/18
See application file for complete search history.

(56) References Cited

U.S. PATENT DOCUMENTS 1,585,258 A  5/1926  Moore
4,023,864 A  5/1977  Lang et al.
(Continued)

FOREIGN PATENT DOCUMENTS

CN  104014123 A  9/2014
CN  104958894 A  10/2015
(Continued)

OTHER PUBLICATIONS

Ben Smither, Balancing Scooter / Skateboard:, video, retrieved Sep. 22, 2016 from https://www.youtube.com/watch?v=HGbbag9dkIU, uploaded to YouTube on Mar. 4, 2007.
(Continued)

*Primary Examiner* — Frank Bennett Vanaman
(74) *Attorney, Agent, or Firm* — Kolisch Hartwell, P.C.

(57) ABSTRACT

A self-balancing electric vehicle may include a platform having first and second foot placement sections rigidly coupled to each other, and a pair of coaxial, motorized wheels independently mounted between the first and second foot placement sections. The first and second wheels may be coupled to the platform via spring suspensions. Rider presence and turning intentions may be determined based on strain induced in the platform by the rider. The strain may be detected by one or more strain gauge systems. One of the strain gauge systems may be configured for use in a steering control circuit, and may include a strain gauge sensor mounted diagonally with respect to a long axis of the platform, such that the strain gauge detects only twist-induced strain.

22 Claims, 13 Drawing Sheets

(51) Int. Cl.
| | |
|---|---|
| A63C 17/01 | (2006.01) |
| A63C 17/22 | (2006.01) |
| G05D 1/08 | (2006.01) |
| A63C 17/26 | (2006.01) |
| G01C 19/56 | (2012.01) |
| G01P 15/18 | (2013.01) |

(52) U.S. Cl.
CPC ............. *A63C 17/26* (2013.01); *B62K 11/007* (2016.11); *G01C 19/56* (2013.01); *G01P 15/18* (2013.01); *G05D 1/0891* (2013.01)

(56) References Cited

U.S. PATENT DOCUMENTS

| | | |
|---|---|---|
| 4,106,786 A | 8/1978 | Talbott |
| 4,109,741 A | 8/1978 | Gabriel |
| 4,795,181 A | 1/1989 | Armstrong |
| 4,997,196 A | 3/1991 | Wood |
| 5,119,277 A | 6/1992 | Copley et al. |
| 5,119,279 A | 6/1992 | Makowsky |
| 5,132,883 A | 7/1992 | La Lumandier |
| 5,487,441 A | 1/1996 | Endo et al. |
| 5,513,080 A | 4/1996 | Magle et al. |
| 5,794,730 A | 8/1998 | Kamen |
| 6,050,357 A | 4/2000 | Staelin et al. |
| 6,223,104 B1 | 4/2001 | Kamen et al. |
| 6,242,701 B1 | 6/2001 | Breed et al. |
| 6,288,505 B1 | 9/2001 | Heinzmann et al. |
| 6,332,103 B1 | 12/2001 | Steenson, Jr. et al. |
| 6,408,240 B1 | 6/2002 | Morrell et al. |
| 6,536,788 B1 | 3/2003 | Kuncz et al. |
| 6,538,411 B1 | 3/2003 | Field et al. |
| 6,553,271 B1 | 4/2003 | Morrell |
| 6,561,294 B1 | 5/2003 | Kamen et al. |
| 6,779,621 B2 | 8/2004 | Kamen et al. |
| 6,789,640 B1 | 9/2004 | Arling et al. |
| 6,827,163 B2 | 12/2004 | Amsbury et al. |
| 6,874,591 B2 | 4/2005 | Morrell et al. |
| 6,965,206 B2 | 11/2005 | Kamen et al. |
| 6,992,452 B1 | 1/2006 | Sachs et al. |
| 7,023,330 B2 | 4/2006 | Kamen et al. |
| 7,053,289 B2 | 5/2006 | Iwai et al. |
| 7,090,040 B2 | 8/2006 | Kamen et al. |
| 7,091,724 B2 | 8/2006 | Heinzmann et al. |
| 7,130,702 B2 | 10/2006 | Morrell |
| 7,138,774 B2 | 11/2006 | Negoro et al. |
| 71,557,875 | 1/2007 | Kamen et al. |
| 7,172,044 B2 | 2/2007 | Bouvet |
| 7,198,280 B2 | 4/2007 | Hara |
| 7,263,453 B1 | 8/2007 | Gansler et al. |
| D551,592 S | 9/2007 | Chang et al. |
| 7,424,927 B2 | 9/2008 | Hiramatsu |
| 7,467,681 B2 | 12/2008 | Hiramatsu |
| 7,479,097 B2 | 1/2009 | Rosborough et al. |
| 7,481,291 B2 | 1/2009 | Nishikawa |
| 7,740,099 B2 | 6/2010 | Field et al. |
| 7,757,794 B2 | 7/2010 | Heinzmann et al. |
| 7,789,174 B2 | 9/2010 | Kamen et al. |
| 7,811,217 B2 | 10/2010 | Odien |
| 7,857,088 B2 | 12/2010 | Field et al. |
| 7,900,725 B2 | 3/2011 | Heinzmann et al. |
| 7,958,961 B1 | 6/2011 | Schade |
| 7,962,256 B2 | 6/2011 | Steven et al. |
| 7,963,352 B2 | 6/2011 | Alexander |
| 7,979,179 B2 | 7/2011 | Gansler |
| 8,052,293 B2 | 11/2011 | Hurwitz |
| 8,083,313 B2 | 12/2011 | Karppinen et al. |
| 8,146,696 B2 | 4/2012 | Kaufman |
| 8,170,780 B2 | 5/2012 | Field et al. |
| 8,467,941 B2 | 6/2013 | Field et al. |
| 8,490,723 B2 | 7/2013 | Heinzmann et al. |
| 8,562,386 B2 | 10/2013 | Carlson et al. |
| 8,682,487 B2 | 3/2014 | Kurth et al. |
| 9,097,598 B2 * | 8/2015 | Grassi .................... G01L 3/108 |
| 9,101,817 B2 | 8/2015 | Doerksen |
| D746,928 S | 1/2016 | Doerksen |
| 9,376,155 B2 | 6/2016 | Ying et al. |
| 9,400,505 B2 | 7/2016 | Doerksen |
| 9,452,802 B2 | 9/2016 | Ying et al. |
| D768,252 S | 10/2016 | Bigler |
| D769,997 S | 10/2016 | Doerksen |
| 9,745,013 B2 | 8/2017 | Wood |
| 2002/0074176 A1* | 6/2002 | Justus ...................... A63C 5/08 180/181 |
| 2005/0121238 A1* | 6/2005 | Ishii ........................ A63C 17/08 180/65.1 |
| 2005/0241864 A1 | 11/2005 | Hiramatsu |
| 2006/0038520 A1 | 2/2006 | Negoro et al. |
| 2006/0049595 A1 | 3/2006 | Crigler et al. |
| 2006/0170174 A1 | 8/2006 | Hiramatsu |
| 2006/0213711 A1 | 9/2006 | Hara |
| 2006/0260862 A1 | 11/2006 | Nishikawa |
| 2007/0194558 A1 | 8/2007 | Stone et al. |
| 2008/0254789 A1 | 10/2008 | De Mathan et al. |
| 2008/0294094 A1 | 11/2008 | Mhatre et al. |
| 2009/0108553 A1 | 4/2009 | Serai et al. |
| 2009/0178877 A1 | 7/2009 | Keller et al. |
| 2010/0114468 A1 | 5/2010 | Field et al. |
| 2011/0071711 A1 | 3/2011 | Sharp et al. |
| 2011/0309772 A1 | 12/2011 | Forgey |
| 2012/0166048 A1 | 6/2012 | Inoue et al. |
| 2012/0232734 A1 | 9/2012 | Pelletier |
| 2013/0081891 A1 | 4/2013 | Ulmen et al. |
| 2013/0175943 A1 | 7/2013 | Tackett |
| 2013/0206493 A1 | 8/2013 | Larson et al. |
| 2013/0238231 A1 | 9/2013 | Chen |
| 2013/0248573 A1 | 9/2013 | Kim et al. |
| 2014/0172262 A1* | 6/2014 | Andoh .................... B60L 15/20 701/71 |
| 2014/0326525 A1 | 11/2014 | Doerksen |
| 2015/0107922 A1 | 4/2015 | Bigler |
| 2015/0323935 A1 | 11/2015 | Doerksen |
| 2017/0088212 A1 | 3/2017 | Edney |
| 2017/0349230 A1 | 12/2017 | Doerksen et al. |

FOREIGN PATENT DOCUMENTS

| | | |
|---|---|---|
| TW | 450823 B | 8/2001 |
| WO | 2009071879 A9 | 6/2009 |

OTHER PUBLICATIONS www.electricunicycle.com, "Leviskate self-balancing one-wheel skateboard", video, retrieved Sep. 22, 2016 from https://www.youtube.com/watch?v=462Jj1xSSqc, uploaded to YouTube on Aug. 5, 2007.

John Xenon, "One wheel self balancing skateboard Ver2 Jan. 2009. #2", video, retrieved Sep. 22, 2016 from https://www.youtube.com/watch?v=8RPFNUsuW78, uploaded to YouTube on Jan. 3, 2009.

Rodger Cleye, "Leviskate (Balancing Skateboard) in Operation", video, retrieved Sep. 22, 2016 from https://www.youtube.com/watch?v=eN2J8m_E0go, uploaded to YouTube on Apr. 18, 2013.

Jul. 23, 2014, Office action in U.S. Appl. No. 14/266,641, which is another application of Applicant Future Motion, Inc.

Aug. 6, 2014, First Action Interview Pilot Program Pre-Interview Communication in U.S. Appl. No. 14/266,641, which is another application of Applicant Future Motion, Inc.

Sep. 11, 2014, International Search Report of the International Searching Authority from the U.S. Receiving Office in PCT/US2014/036244, which is an international application of Applicant Future Motion, Inc.

Sep. 11, 2014, Written Opinion of the International Searching Authority from the U.S. Receiving Office in PCT/US2014/036244, which is an international application of Applicant Future Motion, Inc.

Oct. 29, 2014, Office action in U.S. Appl. No. 14/266,641, which is another application of Applicant Future Motion, Inc.

Nitto Denko Temish® Venting System S-NTF Series Products Data Sheet, circa before Nov. 5, 2014.

(56) References Cited

OTHER PUBLICATIONS

Dec. 17, 2014, final Office action in U.S. Appl. No. 14/266,641, which is another application of Applicant Future Motion, Inc.
Feb. 12, 2015, Office action in U.S. Appl. No. 14/266,641, which is another application of Applicant Future Motion, Inc.
Sep. 30, 2015, Office action in U.S. Appl. No. 14/805,044, which is another application of Applicant Future Motion, Inc.
Nov. 10, 2015, International Preliminary Report on Patentability from The International Bureau of WIPO in PCT/US2014/036244, which is an international application of Applicant Future Motion, Inc.
Jan. 27, 2016, International Search Report of the International Searching Authority from the U.S. Receiving Office in PCT/US2015/059332, which is an international application of Applicant Future Motion, Inc.
Jan. 27, 2016, Written Opinion of the International Searching Authority from the U.S. Receiving Office in PCT/US2015/059332, which is an international application of Applicant Future Motion, Inc.
Jan. 29, 2016, Office action in U.S. Appl. No. 14/934,024, which is another application of Applicant Future Motion, Inc.
Sep. 21, 2016, Office action in U.S. Appl. No. 15/184,906, which is another application of Applicant Future Motion, Inc.
Nov. 17, 2016, Office action in U.S. Appl. No. 15/275,067, which is another application of Applicant Future Motion, Inc.
Jan. 26, 2017, Office action from the Taiwan Intellectual Property Office in Taiwan Divisional Patent Application No. 106100603, which is a foreign application of Applicant Future Motion, Inc.
Jan. 27, 2017, Notice of Allowance and Fee(s) Due in U.S. Appl. No. 15/184,866, which is another application of Applicant Future Motion, Inc.
May 9, 2017, International Preliminary Report on Patentability from the International Bureau of WIPO in PCT/US2015/059332, which is an international application of Applicant Future Motion, Inc.
Jul. 17, 2017, Office action in U.S. Appl. No. 15/612,321, which is another application of Applicant Future Motion, Inc.
Aug. 21, 2017, International Search Report of the International Searching Authority from the U.S. Receiving Office in PCT/US2017/035667, which is an international application of Applicant Future Motion, Inc.
Aug. 21, 2017, Written Opinion of the International Searching Authority from the U.S. Receiving Office in PCT/US2017/035667, which is an international application of Applicant Future Motion, Inc.
"FRS 101", Sensitronics LLC. "The Dynamics of Touch".
"Vent Filter TEMISH® CAPSEAL", Nitto.
Dec. 28, 2017, International Search Report of the International Searching Authority from the U.S. Receiving Office, in PCT/US2017/058366, which is the international application to this U.S. application.
Dec. 28, 2017, Written Opinion of the International Searching Authority from the U.S. Receiving Office, in PCT/US2017/058366, which is the international application to this U.S. application.

* cited by examiner

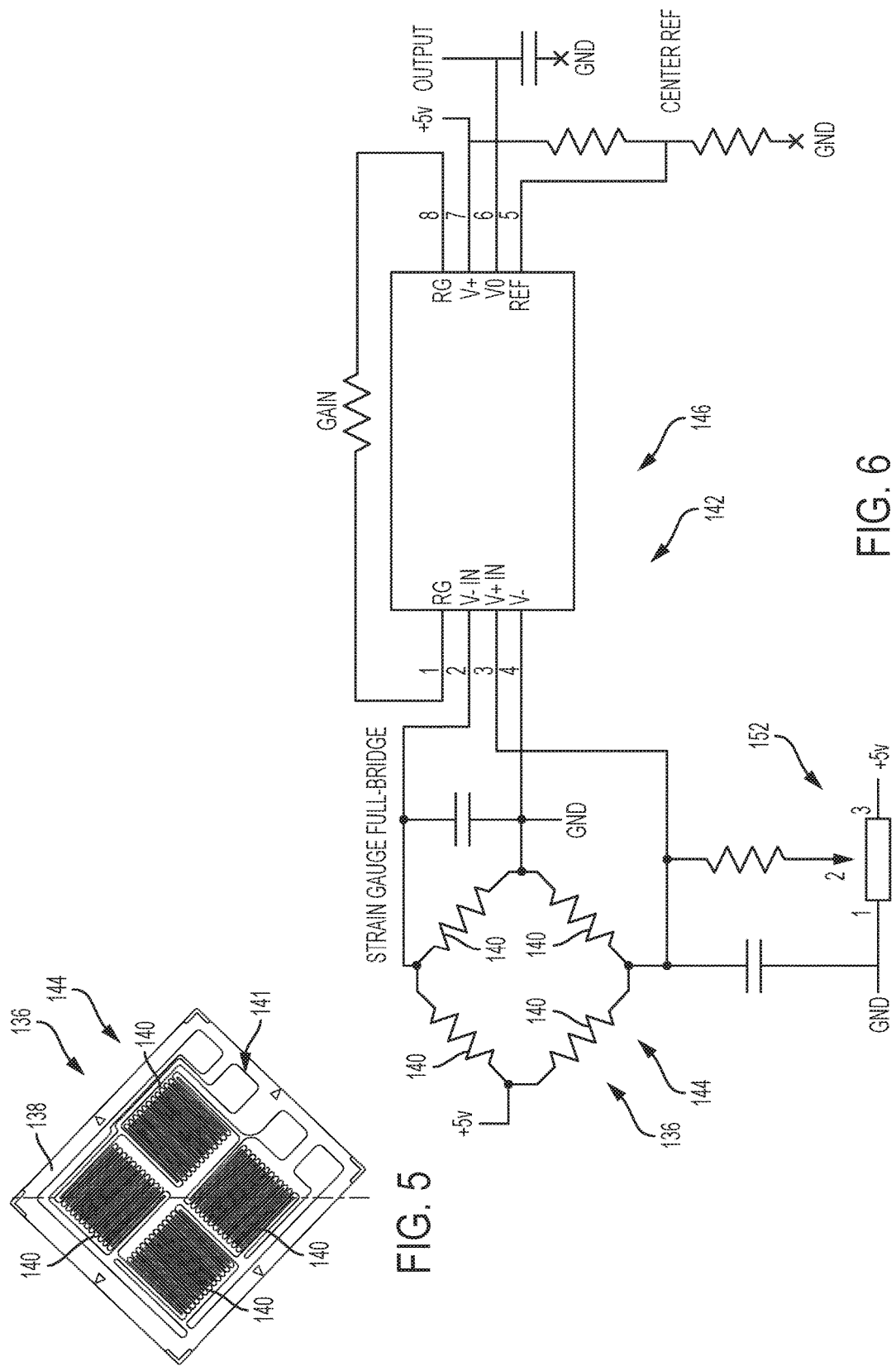

SELF-BALANCING SKATEBOARD WITH STRAIN-BASED CONTROLS AND SUSPENSIONS

CROSS REFERENCES

This application claims the benefit under 35 U.S.C. § 119(e) of the priority of U.S. Provisional Patent Application Ser. No. 62/412,817, filed Oct. 25, 2016, the entirety of which is hereby incorporated by reference for all purposes. The following related applications and materials are incorporated herein, in their entireties, for all purposes: U.S. Pat. No. 9,101,817 entitled "Self-Stabilizing Skateboard," U.S. Pat. No. 9,452,345 entitled "Rider Detection System," and U.S. patent application Ser. No. 15/612,321 entitled "Vehicle Rider Detection Using Strain Gauges."

FIELD

This disclosure relates to systems and methods for self-balancing electric vehicles. More specifically, the disclosed embodiments relate to an improved self-balancing electric skateboard having a pair of wheels that are controlled based on rider-induced strain detected by one or more strain gauge systems.

INTRODUCTION

The popularity of self-balancing electric skateboards has grown considerably over the past several years. Many companies have entered this market, with slightly differing designs. Generally speaking, these vehicles lack any steering controls and have suffered from various issues, such as safety and reliability problems related to lack of traction and lack of turning ability, and a lack of customizability of riding characteristics. A need exists for a simpler and more reliable control system for these electric vehicles.

SUMMARY

Self-balancing electric skateboards according to the present teachings overcome the issues described above by using one or more strain gauge systems to detect rider-induced strain and utilize suspension members on the ground contacting wheels.

The present disclosure provides systems, apparatuses, and methods relating to self-balancing electric skateboards. In some embodiments, a self-balancing electric vehicle may include: a platform including a first foot placement section and a second foot placement section coupled to the first foot placement section, the first and second foot placement sections each configured to receive a left or right foot of a rider oriented generally perpendicular to a longitudinal axis of the platform; a first wheel and a second wheel coupled to the platform generally between the first and second foot placement sections, the first and second wheels sharing a common axis of rotation oriented perpendicular to the longitudinal axis of the platform; a first motor assembly mounted to the platform and configured to rotate the first wheel, and a second motor assembly mounted to the platform and configured to rotate the second wheel, wherein the first and second motor assemblies are configured to propel the electric vehicle; an orientation sensor coupled to the platform and configured to sense an orientation of the platform; a first strain gauge coupled to the platform and configured to sense a twisting strain in the platform induced by unbalanced forces exerted upon the first and second foot placement sections; and one or more motor controllers configured to cause the first and second motor assemblies to propel the electric vehicle based on platform orientation information measured by the orientation sensor and to turn the electric vehicle by driving the first and second wheels differentially in response to twisting strain information measured by the first strain gauge.

In some embodiments, a self-balancing electric vehicle may include: a platform including a first foot placement section rigidly coupled to a second foot placement section, each of the foot placement sections configured to receive a left or right foot of a rider oriented generally perpendicular to a longitudinal axis of the platform; a pair of coaxial wheels coupled to the platform, each wheel driven by a respective motor assembly to propel the vehicle; an orientation sensor coupled to the platform and configured to sense a tilting orientation of the platform about a tilt axis oriented perpendicular to the longitudinal axis of the platform; a first strain gauge coupled to the platform and configured to sense a twisting strain in the platform induced by unbalanced forces exerted upon the first and second foot placement sections; and one or more motor controllers configured to cause the motor assemblies to propel the electric vehicle based on platform tilt information measured by the orientation sensor and to turn the electric vehicle by driving each of the wheels independently in response to twisting strain information measured by the first strain gauge.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 5 is a plan view of an illustrative full bridge strain gauge sensor suitable for use in vehicles described herein.

FIG. 6 is a schematic circuit diagram of an illustrative strain gauge sensor and amplification circuit suitable for use with vehicles described herein.

DESCRIPTION

Various aspects and examples of a self-balancing electric skateboard having strain-based controls, as well as related systems and methods, are described below and illustrated in the associated drawings. Unless otherwise specified, a self-balancing skateboard in accordance with the present teachings, and/or its various components, may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components.

Overview

Figure 1:
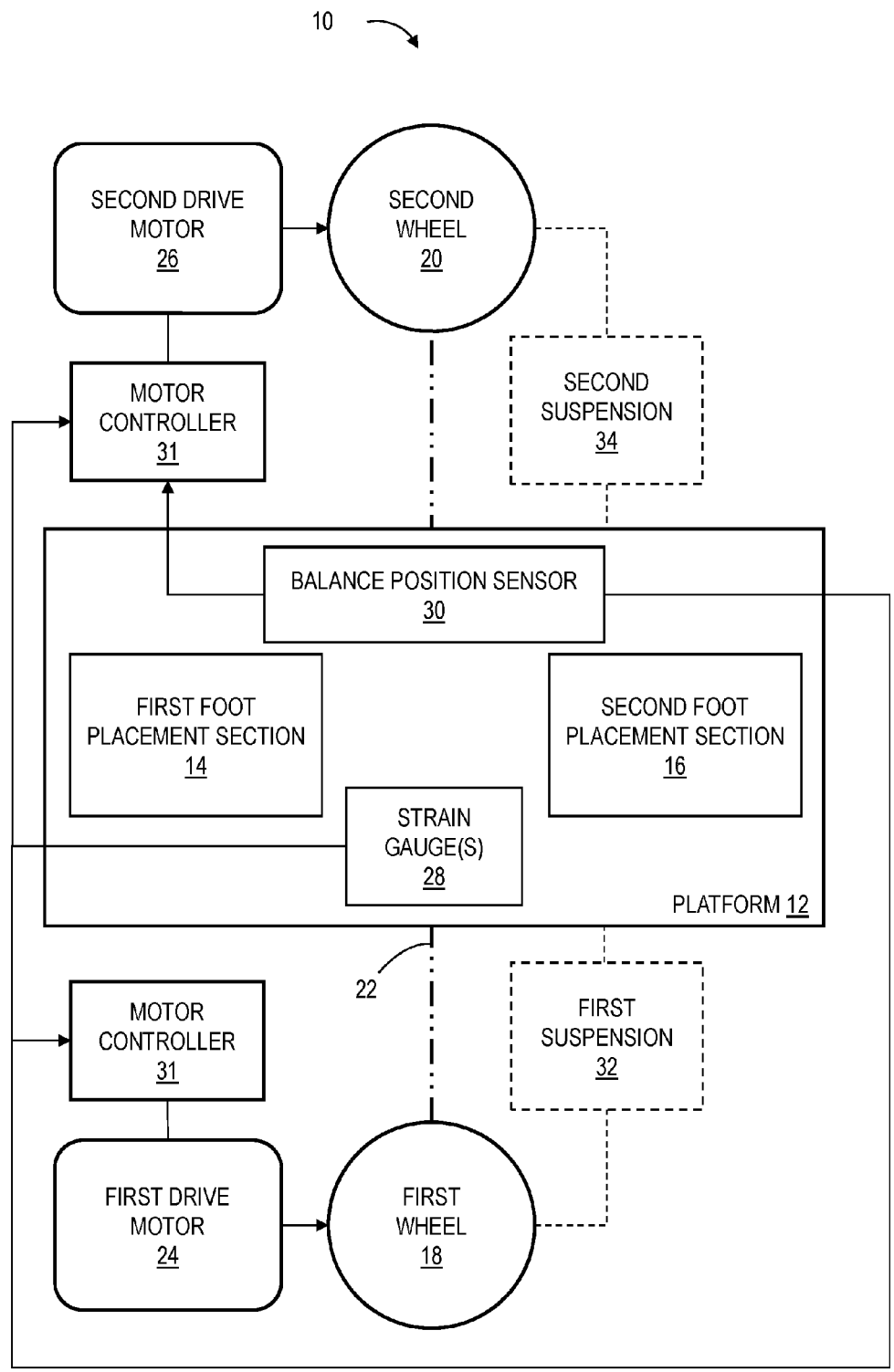
FIG. 1 is a schematic block diagram of an illustrative self-balancing skateboard in accordance with aspects of the present disclosure.

Self-balancing electric vehicles disclosed herein use one or more strain gauges to detect rider-induced strain. Vehicles (also referred to as skateboards) of the present disclosure use the detected strain to determine the presence and/or weight of a rider, as well as to detect twisting strain corresponding to a command to turn the vehicle. FIG. 1 shows a schematic diagram of an illustrative self-balancing electric vehicle 10 having one or more strain gauge systems to detect rider-induced strain.

In general, self-balancing electric vehicles in accordance with aspects of the present disclosure, such as vehicle 10, may include a personal vehicle having a riding platform 12 comprising a pair of foot placement sections (e.g., a first foot placement section 14 and a second foot placement section 16) rigidly attached to each other and oriented generally perpendicular to a longitudinal axis of the board. Vehicle 10 includes two coaxial wheels (e.g., a first wheel 18 and a second wheel 20) substantially centered on the platform. Foot placement sections 14 and 16 may also be referred to as foot placement areas. A rider's feet may be received on the foot placement sections with toes generally pointed perpendicular to the direction of travel. In other words, vehicle 10 is mounted by a rider in the fashion of a typical skateboard, such that the rider's torso is generally facing perpendicular to the direction of travel, which is to the right or left from the perspective of the rider. Central wheels 18 and 20 share a common axis of rotation 22 oriented generally perpendicular to the direction of travel. Wheels 18 and 20 also have individual, respective motors (i.e., a first drive motor 24 and a second drive motor 26), and are controlled to drive the vehicle toward self-balancing. Motors 24 and/or 26 may comprise hub motors. In the examples described herein, the electric vehicle has no more than the two, coaxial wheels described above. However, any suitable number of wheels may be utilized. In some examples, the rotational axis of the two wheels may be oriented differently than described, such as parallel to the longitudinal axis of the platform. In some examples, the two coaxial wheels share a common axle. In some examples, the two coaxial wheels have independent, respective axles. Axle(s) of the wheels may be fixed (i.e., non-rotating) relative to platform 12.

Suitable motor controls may include one or more sensors, e.g., one or more strain gauge systems 28 and/or a balance position sensor 30. Strain gauge systems 28 may include any suitable strain gauge-based load cells configured to measure the effects of rider-induced forces on foot placement sections 14 and 16, thereby giving the rider precise control over the magnitude and direction of yaw (i.e., turning) movements. Balance position sensor 30 may include any suitable board position sensor(s) configured to measure an inclination of skateboard 10, thereby providing the motor control system with balance-related feedback. Suitable motor controls may include one or more motor controller(s) 31. Motor controller(s) 31 may receive information from strain gauge systems 28 and/or balance position sensor 30. In some embodiments, a single motor controller 31 may control both first drive motor 24 and second drive motor 26. In some embodiments, each drive motor may be controlled by a respective motor controller 31. Various embodiments are disclosed herein, including examples having an additional strain gauge system used to detect a rider's presence by detecting the rider's weight. In some examples, the measured weight of a rider may be used to adjust the aggressiveness or other characteristics of the balance controls. In some examples, wireless communication connectivity may be used to customize a ride experience.

In the vehicles described herein, a desired turn may be commanded by the rider by applying toe pressure on one foot placement section and simultaneously applying heel pressure on the other foot placement section, causing a twisting strain on the board. Steering controls of the vehicle respond, using a strain gauge system (such as strain gauge(s) 28) to detect the twist strain induced on the vehicle by the rider's differentially applied forces. Accordingly, an effective and simple system may be used to control, for example, self-balancing vehicle 10 with centered, coaxial wheels.

The strain gauge twist-detection control system described herein, detects a twisting strain to determine how to command the vehicle to turn. The system is configured to independently control wheels 18 and 20 based on the detected twisting strain. For example, when a twisting strain corresponding to a command to turn to the left is detected, the right wheel may be driven faster than the left wheel, causing vehicle 10 to turn. Similarly, when a twisting strain corresponding to a command to turn to the right is detected, the left wheel may be driven faster than the right wheel, causing vehicle 10 to turn to the right. In some examples, the center area of the vehicle platform includes a Wheatstone full-bridge strain gauge (or the like) and an associated amplifier, configured to detect the induced stress on the vehicle applied as a result of the rider's body position. As the rider shifts weight between toe and heel on each side platform, a twisting (i.e., torque) stress is induced into the frame. This twisting stress is measured by strain gauge system 28. The detected twisting/torque stress, also known as a twisting strain, is then used to determine how to command the vehicle to turn (yaw), based on the magnitude and direction of the rider-induced twist (i.e., the intended turn command). Speed or torque differences between the two wheels may be controlled such that the difference relates to the amount or magnitude of twisting strain detected. For example, the wheel speed differential may be proportional to the magnitude of the sensed twisting strain. In some examples, a relationship between the speed or torque differential and the sensed twisting strain may be adjustable (manually or automatically, e.g., based on weight), linear or nonlinear, and/or carried out in accordance with a defined response profile. In some examples, limits may be set such that the speed of the faster wheel cannot exceed a predetermined percentage above the speed of the slower wheel.

Additionally, in some examples, a second system having a similar Wheatstone full-bridge strain gauge (or the like) may be coupled to the frame of platform 12 to measure stresses induced by the rider's weight. This rider detection strain gauge may be disposed in any suitable location, such as the center area of platform 12 (bottom or top). In some examples, detecting the presence of a rider may include determining whether the strain gauge voltage is above a given threshold. This may avoid false detections of a rider as well as preventing children from riding vehicle 10. Additional suitable examples of strain gauge-based rider detection systems are described in U.S. patent application Ser. No. 15/612,321, the entirety of which is hereby incorporated by reference. Furthermore, suitable examples of other rider detection systems are described in U.S. Pat. No. 9,452,345, the entirety of which is also hereby incorporated by reference.

The strain gauge-based rider detection system, when present, is configured to measure rider weight, and correspondingly to detect when a rider is present. If rider presence is detected, power may be enabled to the motors. If a rider is not detected, power is safely shut off. The rider weight measurement may also be used to set the aggressiveness of the proportional-integral-derivative (PID) controller (also referred to as a PID loop) of the self-balancing controls. For example, a softer control may automatically be implemented for lightweight riders, and a stronger, more aggressive control for heavier riders, thereby greatly adding to the safety of the vehicle. In some embodiments, the centrally mounted motors (i.e. drive motors 24 and 26) and wheels (i.e. wheels 18 and 20) are coupled to the platform via a yielding suspension (e.g., a first suspension member 32 and a second suspension member 34), which allows significant independent up and down compression and expansion. First and second suspension members 32, 34 may also be referred to as yielding suspensions, suspension elements, and/or suspension structures. The suspension members may limit wheel camber while also yielding in a resilient manner, so as to keep the wheels generally parallel to each other. Accordingly, an effective suspension allows the skateboard to lean, turn, or roll, while maintaining useful ground traction.

In some examples, a traction control module monitors each wheel's rotational velocity and is configured to adjust the torque applied to each wheel 18, 20 to limit slippage when traction is lower on one wheel relative to the other. For example, when the rider is leaning the board to perform a turn, one wheel will have more weight and thus better traction than the other. In some examples, a method of controlling traction includes configuring the controller to limit the maximum wheel speed of the faster wheel to a selected percentage above the slower wheel.

EXAMPLES, COMPONENTS, AND ALTERNATIVES

The following sections describe selected aspects of exemplary self-balancing skateboards having strain gauge-based controls, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Electric Self-Balancing Skateboard

Figure 2:
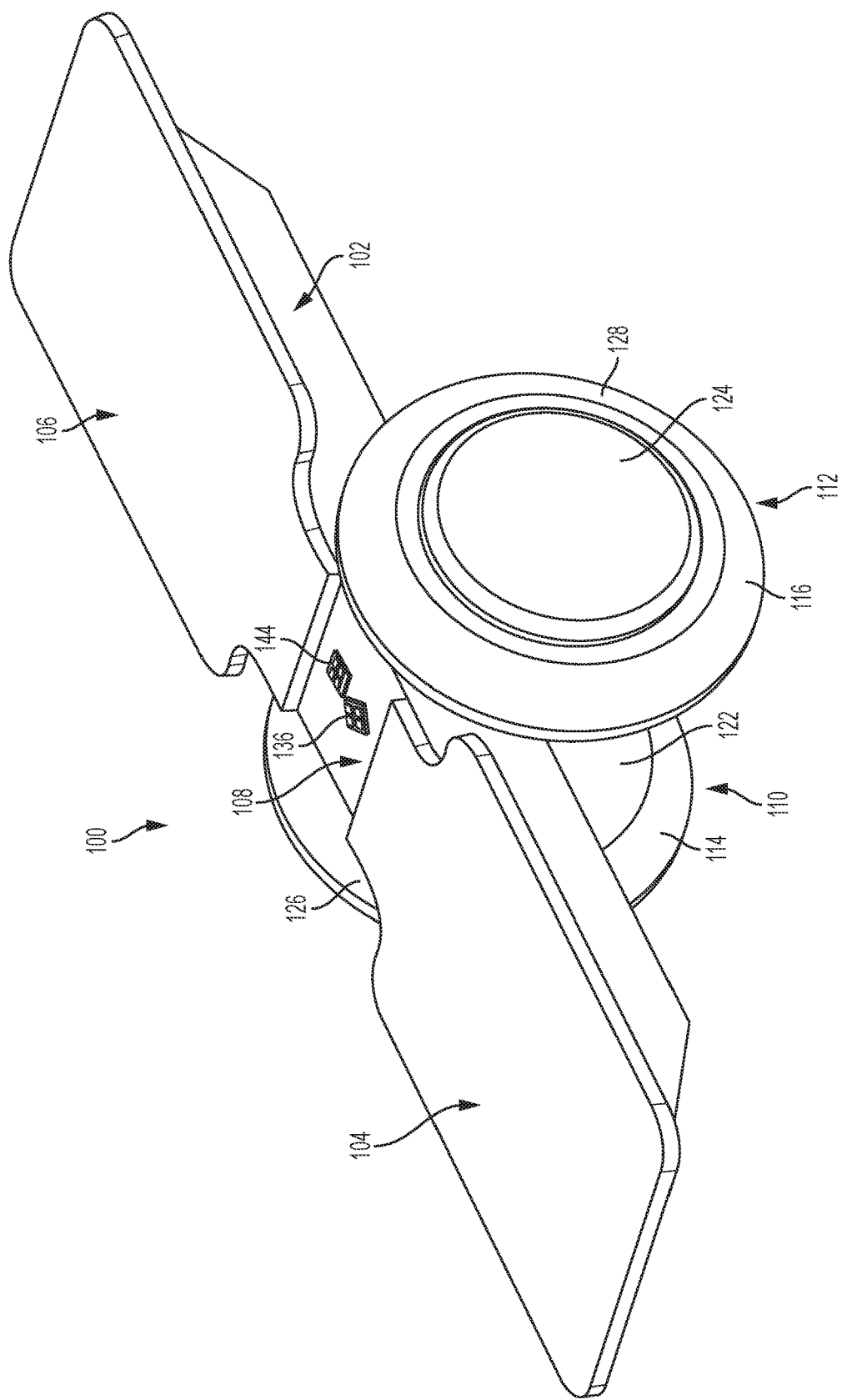
FIG. 2 is an isometric front oblique view of an illustrative two-wheeled self-balancing electric skateboard having induced-strain rider detection and turn controls and wheel suspensions in accordance with aspects of the present disclosure.
Figure 3:
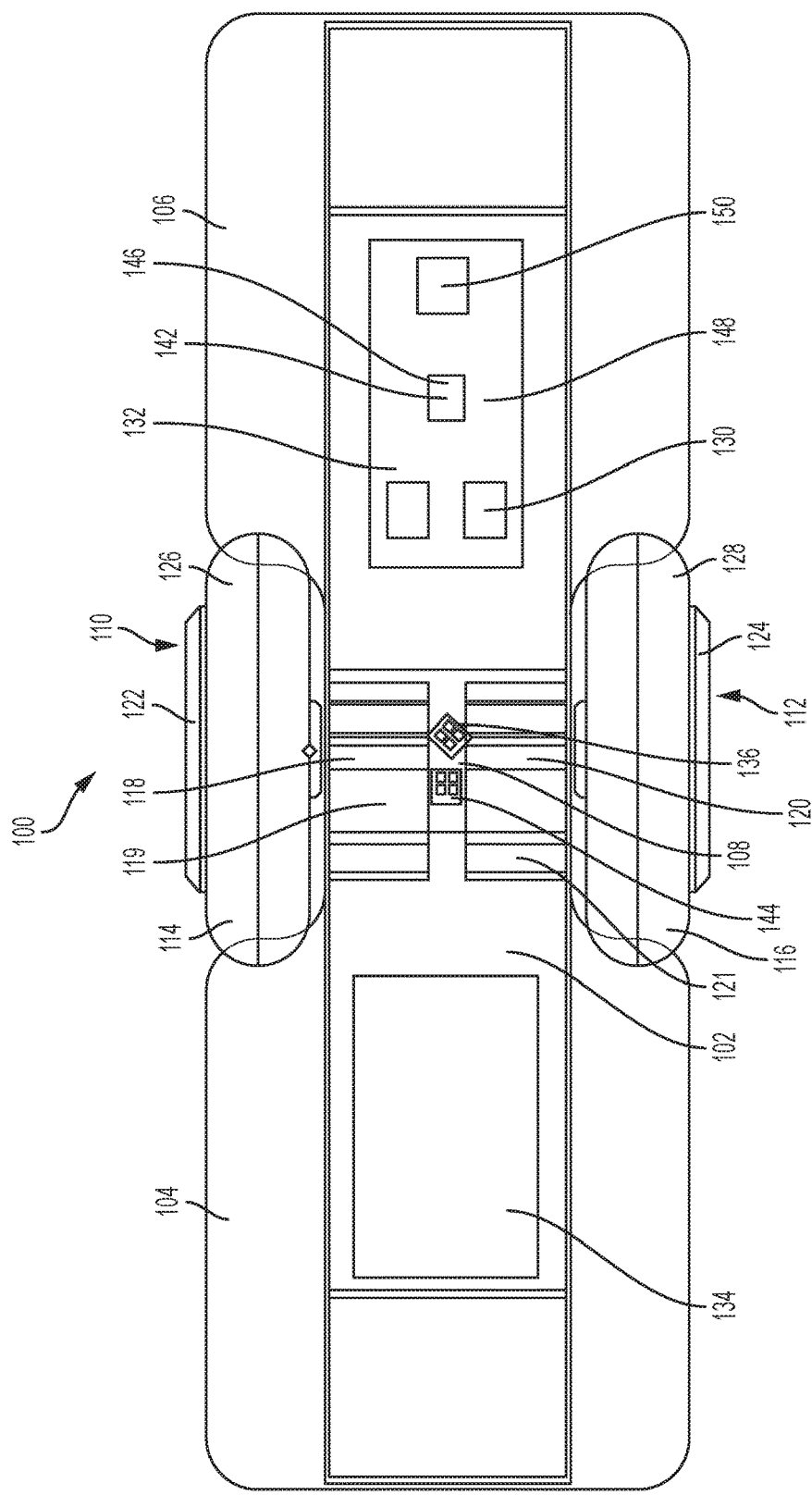
FIG. 3 is a partially transparent top view of the vehicle of FIG. 2.
Figure 4:
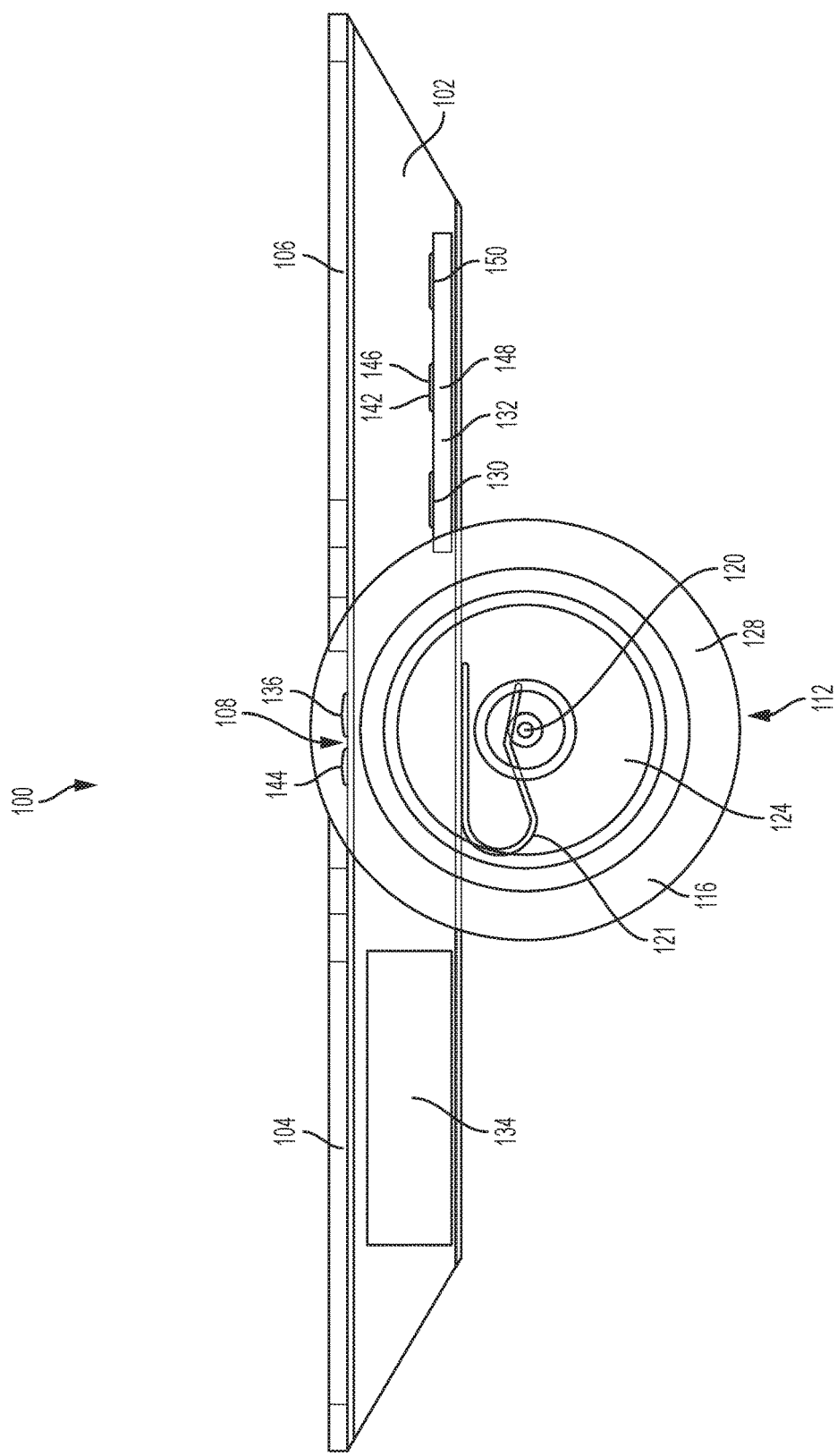
FIG. 4 is a partially transparent side view of the vehicle of FIG. 2.

As shown in FIGS. 2-4, this section describes an illustrative two-wheeled self-balancing skateboard vehicle 100 including controls having one or more strain gauge systems, as well as related methods. Vehicle 100 is an example of system 10 described above.

FIG. 2 is an isometric front oblique view of vehicle 100. FIG. 3 is a top elevation view of the vehicle. FIG. 4 is a side plan view of the vehicle. FIG. 5 is a plan view of an illustrative full bridge strain gauge sensor suitable for use in vehicle 100. FIG. 6 is a schematic circuit diagram of an illustrative strain gauge sensor and amplification circuit suitable for use in vehicle 100.

With reference to FIGS. 2-4, vehicle 100 includes a frame 102 having two foot placement areas 104, 106, coupled together, each foot placement area being of sufficient size to receive the foot of a user with toes pointed generally perpendicular to the direction of travel. Foot placement areas 104, 106 may be examples of first and second foot placement sections 14, 16. Each foot placement area may include a surface tread to provide traction. Together, foot placement areas 104 and 106 may form a substantially rigid riding platform (also referred to as a foot platform or board). Accordingly, foot placement areas 104 and 106 may each be referred to as a platform portion. Frame 102 may include any suitable structure configured such that foot placement areas 104 and 106 are fixed to each other with negligible flex or movement. Certain areas of frame 102, e.g., a center region 108, will be induced with stress from the rider, due to the rider's body orientation.

Motorized hub assemblies 110 and 112 are operatively connected to suspension elements 119 and 121, which are coupled to the central area of frame 102. Assemblies 110 and 112 are configured to drive respective wheels 114 and 116 (examples of wheels 18 and 20). Wheels 114 and 116 are mounted with respective, coaxial axles 118 and 120, as shown in FIGS. 2-4. Motorized hub assemblies 110 and 112 may each include any suitable hub motor, such as typical hub motors known in the art. For example, the drive arrangement may use any combination of brushless direct current (i.e., BLDC) hub motors 122 and 124 with integrated tires 126 and 128. Hub motors 122 and 124 are examples of first and second drive motors 24 and 26, described above. In some examples, a separate wheel and drive motor (brushed or brushless) may be utilized, with power transferred via a drive chain or transmission. In some examples, a hubless wheel may be driven by a friction drive motor.

Figure 7:
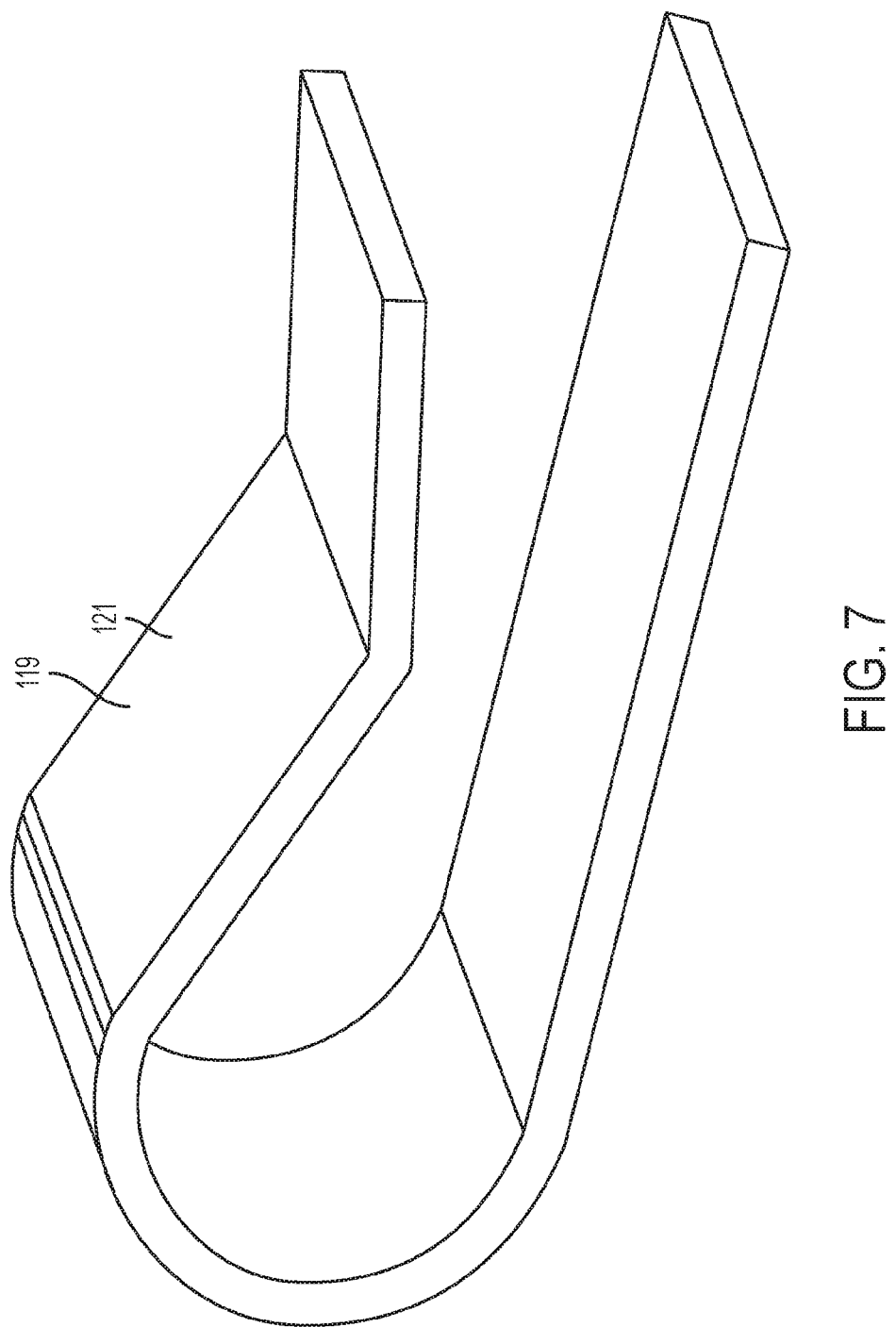
FIG. 7 is an isometric front oblique view of a spring steel suspension element.
Figure 8:
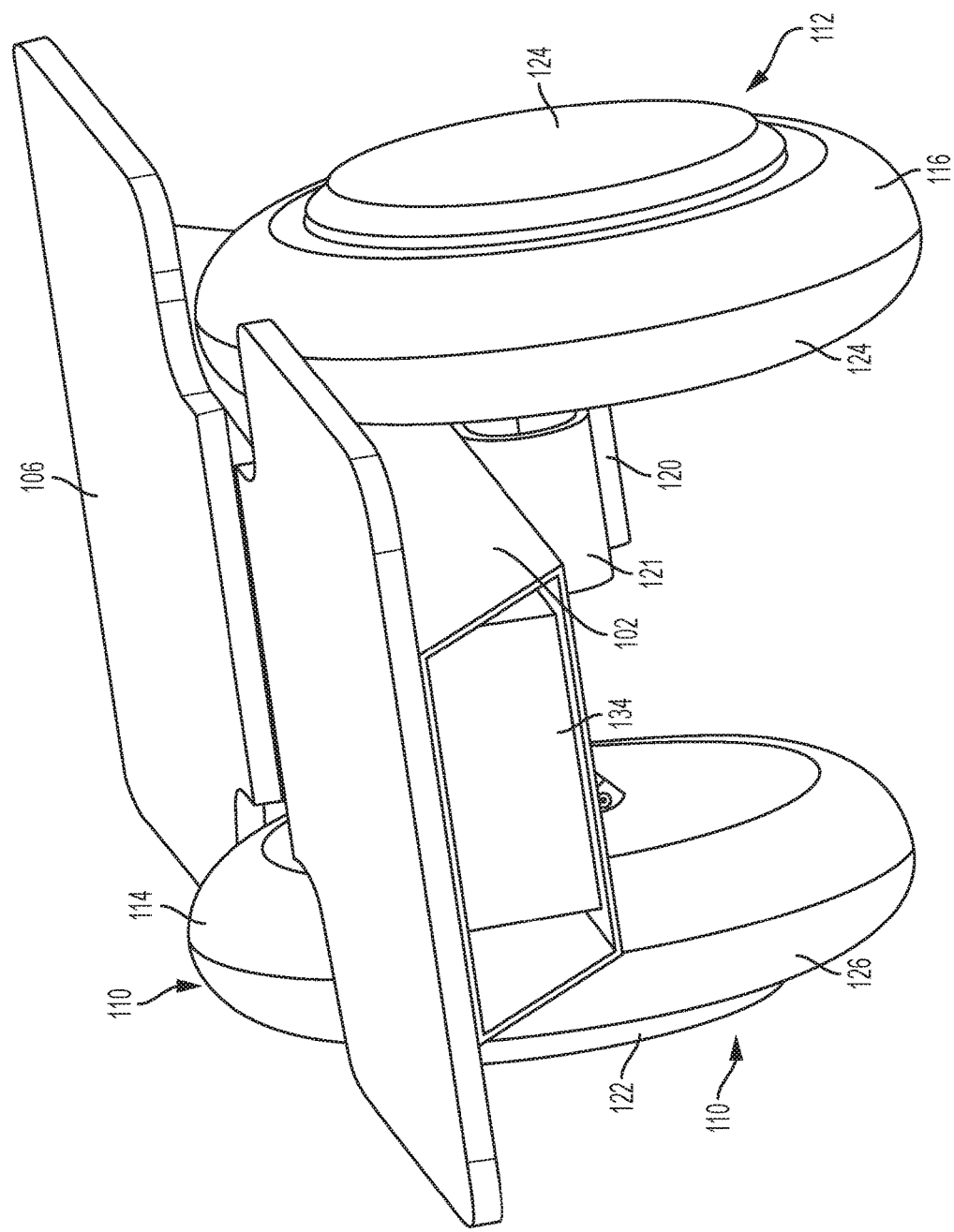
FIG. 8 is an isometric view of the vehicle of FIG. 2 with a first suspension element compressed and a second suspension element relaxed.
Figure 9:
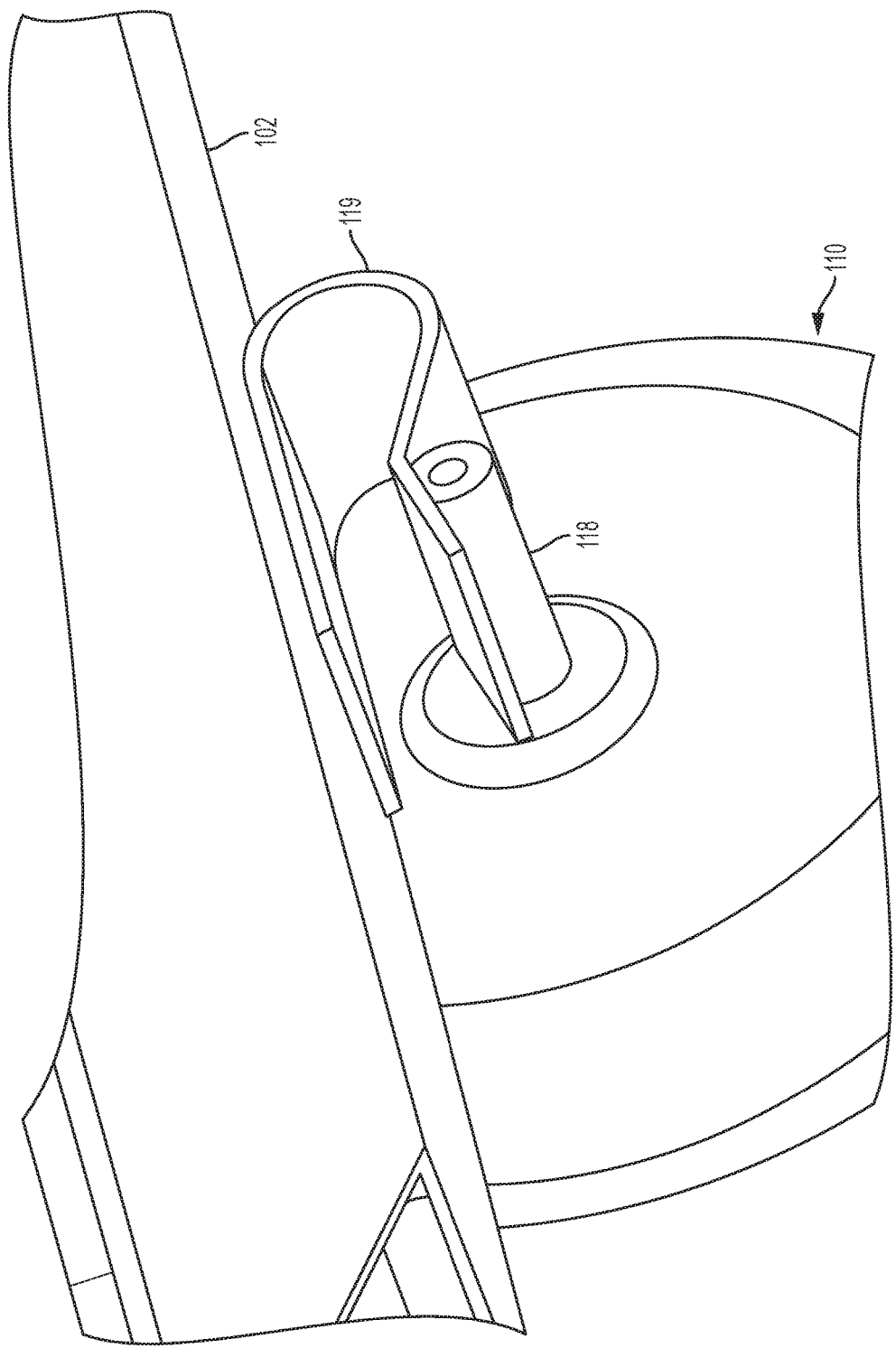
FIG. 9 is an inside bottom isometric view of the vehicle of FIG. 2, depicting a detailed view of a motor shaft and suspension arrangement.
Figure 10:
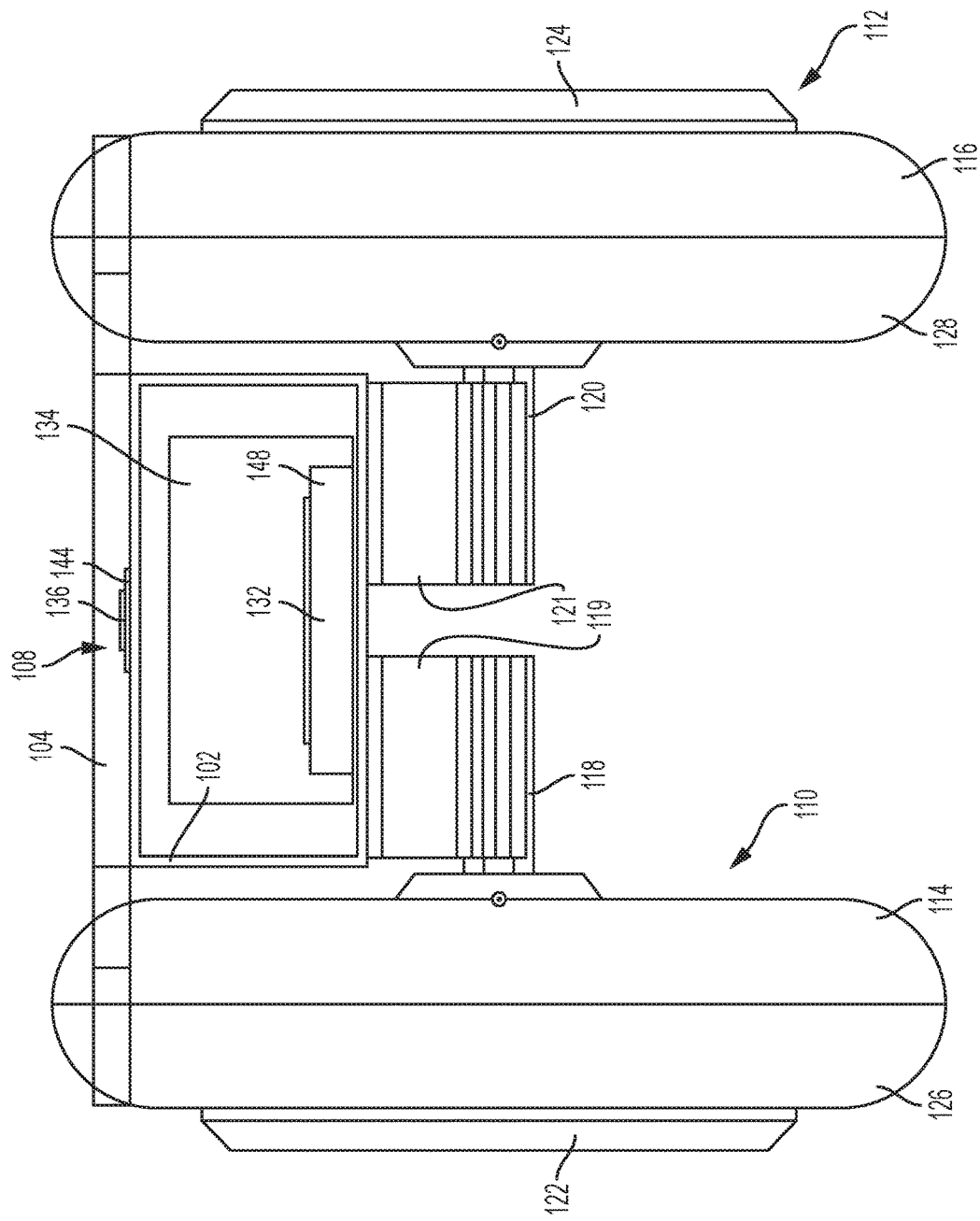
FIG. 10 is a side view of the vehicle of FIG. 2.

With reference to FIGS. 7-10, suspension elements 119 and 121 are configured to allow the wheels to yield and flex between the ground and the foot platforms. FIG. 7 depicts a spring steel suspension which allows up and down yielding while biasing against camber movement and rotation. Preventing unwanted camber keeps the wheels substantially parallel to each other. Suspension elements 119 and 121 may include any suitable structure and/or device configured to provide resilient flexibility in a generally vertical direction while also limiting flexibility on other axes. For example, an alternate suspension system may include a four-bar suspension arrangement with a compressible rubber or silicone center. FIG. 8 depicts the vehicle forced into a "lean" (i.e., a lateral tilt), where the rider has placed more weight to one side (e.g., toe side or heel side), thereby compressing one suspension element and expanding the other suspension element. Both wheels continue to contact the ground and continue to provide traction. FIGS. 9-10 depict additional aspects of spring suspension 119 mounted to axle 118 and motor 110.

A balance position sensor 130 is coupled (e.g., mounted) to frame 102, and configured to sense a tilt position of the vehicle frame wherein one foot of the rider is vertically higher than the other (i.e., rotation of the vehicle platform about the axis of the wheels, also referred to as the vehicle's pitch). Balance position sensor 130 may include any suitable balance sensor, e.g., a combined microelectromechanical systems (MEMS) inertial sensor, such as a six-axis rate gyro and accelerometer. In some examples, sensor 130 is configured to provide a measurement of the position (inclination and inertial movement) of the entire frame 102. Sensor 130 is preferably mounted on a circuit board 132, which is attached to frame 102. Sensor 130 may be disposed in any suitable location on the frame. However, a location closer to the center of the vehicle may provide reduced centrifugal force errors caused by vehicle movement.

A rechargeable battery 134 and battery protection circuit are mounted to frame 102 to provide power for the vehicle. Battery 134 may include any suitable power storage device, e.g., a secondary cell, such as a lithium ion battery.

A first (twist-sensing) full-bridge strain gauge 136 is bonded, e.g., at a 45-degree angle, onto frame 102 of vehicle 100. Strain gauge 136 is an example of strain gauge(s) 28 described above. An example of a full-bridge strain gauge, such as strain gauge 136, is shown in FIG. 5. Strain gauge 136 may include a flexible, insulating substrate 138 supporting one or more conductive foil zig-zag patterns 140. Deformation of pattern 140 changes the electrical resistance of the pattern, which can be measured at leads 141. The change in resistance can then be used to infer the magnitude of induced stress, according to known methods.

Strain gauge 136 may be located at or near center region 108 (e.g., between or at the intersection of foot placement areas 104 and 106), and/or anywhere a majority of strain is induced by twisting action caused by the rider. Strain gauge 136 is configured to detect stresses induced by imbalanced forces on the two foot placement areas, specifically twisting strain on vehicle 100 induced by the rider. The rider can selectively induce this strain by pressing down with the toes on one foot and simultaneously with the heel on the other foot. One or more twist-sensing strain gauges may be placed on the top (or bottom) of center region 108 of frame 102 (for example), at an approximately 45-degree angle with respect to the long axis of the vehicle (i.e., diagonally). This arrangement may cause the strain gauge(s) to only measure torque/twist strain induced by the rider, effectively ignoring strain caused solely by the weight of the rider. Proper alignment of these gauge(s) may therefore prevent undesired detection of strain from the rider's weight and other factors. In some examples, a single or half-bridge strain gauge may instead be used. In the present example, as shown in FIGS. 2-4, strain gauge 136 is bonded to frame 102 at a 45-degree angle, on a top surface of the frame, such that the strain gauge will detect symmetrical, twist-induced strain on frame 102.

As shown in FIG. 6, the analog output of strain gauge 136 may be amplified with an amplifier circuit 142. Circuit 142 may include any suitable amplification components, and the circuit depicted in FIG. 6 is illustrative in nature. The yaw (turning) direction and speed (or torque) may be derived from the analog voltage, when an operational amplifier is used to detect the voltage shift caused by the strain gauge pairs stretching and/or compressing in response to the induced stresses on the vehicle. Circuit 142 provides a method for measuring these small voltage changes and supplying an output voltage (corresponding to an intended turn) to a microcontroller (see FIG. 13). The microcontroller then reads the turn request information and commands a motor controller circuit (see below) to turn the vehicle according to the rider's induced torque.

A second (rider detection) full bridge strain gauge 144 is bonded at any substantially 90-degree angle onto frame 102, in or near center region 108 where rider weight induces stress, e.g., at a top side and/or bottom side of the frame. Strain gauge 144 may be amplified with an amplifier circuit 146, which may be substantially identical to circuit 142 (see FIG. 6), and is configured to detect rider weight-induced strain on vehicle 100. As the rider steps anywhere onto the top-facing side of the vehicle, a strain is induced and detected by this sensor, thereby indicating when a rider is present and enabling the motor drive system. A magnitude of the induced stress may be proportional to rider weight. This element of the control system may be referred to as the rider-detect system or rider detection. When the rider steps off the vehicle, the control system will stop driving the wheels (e.g., by shutting off the motors), such that the vehicle comes to a stop, and/or may disable the self-balancing functions. In some examples, a single or half bridge strain gauge may instead be used.

The rider's weight may be precisely calculated, based on a magnitude of the detected strain. This weight may be used to adjust the aggressiveness of the balance control PID loop. This facilitates a less aggressive balance control with a lightweight rider and a tighter, more aggressive balance control for a heavier rider, with granular variation in between. This feature increases safety and helps to prevent falls from an overly aggressive vehicle balance system with light rider, or from an underpowered soft-balanced vehicle with heavy rider. In other words, the vehicle's balance loop may be matched appropriately to the rider's weight, as sensed by the second strain gauge.

When rider detection strain gauge 144 indicates that a rider is present, sensed position measurements from balance position sensor 130 and sensed strain measurements from twisting strain gauge sensor 136 are used by a motor controller circuit 148 to drive motors 122, 124 and wheels 114, 116. Specifically, outputs of balance position sensor 130 and twisting strain gauge sensor 136 are used by motor controller circuit 148 to drive motors 122 and 124. Motors 122 and 124 are controlled, for example, to bring the vehicle into a self-balanced state, to drive forward or reverse, and/or to turn the vehicle according to the rider's indicated intention. Balance control logic in controller circuit 148 receives the sensed position measurements and drives the wheels toward self-balancing. Self-balancing control logic is described in further detail below.

Twist strain sensor 136 measures inferred rider body position by sensing the strain on frame 102 in center region 108. This data is then used by motor controller circuit 148 to command differing torque to motors 122 and 124, causing vehicle 100 to turn in the rider's desired direction. In some cases, torque commands may include a proportional amount of opposing differential torque to each wheel's motor. In some cases, torque commands may include an appropriate amount of torque to achieve a proportional amount of opposite differential velocity to each wheel's motor. The more twist force applied to vehicle frame 102 by the rider, i.e., by pressing the toes on foot placement area 104 and the heel on foot placement area 106 (or vice versa), the more sharply the vehicle will be turned. In some examples, the sharpness of the turn may be limited or capped.

The rider's turn request, i.e., in the form of measured twisting strain, may be used in the control system to apply opposite torque to each motor 122, 124, thereby driving the vehicle in the desired yaw direction and velocity. The control system may monitor the yaw rate (e.g., using a MEMS rate gyro) to determine the yaw direction and velocity, to ensure the rider's yaw command is properly executed and within safe margins. An anti-yaw-spin function may command a counter-yaw torque based on the yaw rate (e.g., measured by the MEMS rate gyro), thereby preventing unsafe spin speeds. This anti-yaw-spin command may be exponential, based on the yaw rate gyro output. In some examples, yaw velocity and direction may be measured by the difference between the two wheels' revolution speeds (e.g., in revolutions per minute, RPM).

As mentioned above, overall balance control PID aggressiveness may be lessened in response to a lightweight rider and increased as the rider's weight rises. Additionally or alternatively, the reactivity of motor controller circuit 148 with respect to turning may also be automatically adjusted based on rider weight, and/or may be adjusted to different selectable rider modes. It may be advantageous to provide an automatically-adjusting turning rate sensitivity that depends on the rider's weight, for example, because a lightweight rider may not be able to induce as much twisting stress as a heavier rider. Accordingly, a lightweight rider may desire more twist sensitivity and a heavier rider less sensitivity.

In examples where rider modes are selectable, for example, a new rider may select a more sluggish, less responsive "learning" mode that provides a safer and more comfortable turning speed. Meanwhile, an expert rider may select a very fast and responsive turning speed. In some examples, this rider mode can be communicated to motor controller circuit 148 through a wireless connection device 150 disposed on vehicle 100, such as a Bluetooth Smart (also known as Bluetooth Low Energy or BLE) module, e.g., using a smartphone app.

In some examples, vehicle 100 may save in memory the desired settings of each individual rider, e.g., according to his or her measured weight, and/or may recall a previously established profile (e.g., through a wireless connection to a smartphone). Such a profile may include information regarding balance aggressiveness, turning sensitivity, maximum speed, and/or the like.

Strain gauges are initially calibrated to center when zero strain is applied to the frame. However, strain gauges have a known tendency for their accuracy to drift over time. In some examples, the control logic of vehicle 100 may calibrate, upon startup, the zero points of any or all strain gauges. The calibration may be averaged and saved in memory over several startup events to prevent inadvertent strain adversely affecting the calibration. Accordingly, as the vehicle is used it will be gradually calibrated with each power-on cycle.

The user may be directed to power the vehicle without any weight or strain applied to the frame, such that at startup the strain gauges can be automatically zeroed/centered to cancel out drift. Drift will be gradual over time, so this power-up calibration may be configured to affect the drift value by a small amount, as to avoid erroneous calibration by an accidental strain applied during startup.

An erroneous calibration may be detected for example if, upon power-up, a very large calibration need is measured. This error will be ignored and the rider may be warned accordingly. A full user-initiated calibration method may be provided as well (e.g., a "tare" button or command).

In some examples, strain gauges may be centered by detecting when a sensor is being quickly saturated while vehicle 100 is ridden. In these examples, the gauge will be slowly centered over time to ensure full movement in both directions. In some examples, center calibration of the zero point of a strain gauge may be achieved using a digital to analog converter (DAC) output of the microcontroller connected to the strain gauge through a high value resistor (e.g., 470K Ohms). This DAC output will essentially replace a potentiometer 152 of circuit 142, 146 (see FIG. 6) and allow the microcontroller to adjust the center points of the strain gauge full bridge system.

In some examples, strain gauges may alternatively or additionally be placed under forward and aft portions of each foot placement area (104, 106), to directly detect the weight of the toe and heel of each foot. For example, four strain gauge systems in total may be used to respectively measure the toes and heels of a rider (two under each foot placement area). The measured strain could then be used to determine the turning intention of the rider in a similar manner, and also to determine when a rider is on or off the vehicle.

In some examples, a remote control feature may be implemented to control vehicle 100 using a portable electronic device (e.g., a smartphone) and installed app, via wireless module 150. This feature may be enabled or disabled by the rider detection circuit, e.g., to prevent remote control when a rider is present. In some examples, the rider detection weight threshold may be adjusted using the rider's smartphone app and wireless module 150, such that only riders above a certain weight are permitted to use the vehicle (e.g., preventing children from unauthorized use).

In some examples, foot placement areas 104 and 106 may be implemented both on the top and the bottom of the vehicle, such that the platform and/or vehicle is symmetrical with respect to riding surface. In these examples, a rider can ride on the "top" side or "bottom" side, whichever may be more convenient at the time when the rider approaches the vehicle. The rider detect can detect weight in either direction, and be configured to drive toward self-balancing with the rider-weighted side defined as "up."

Figure 11:
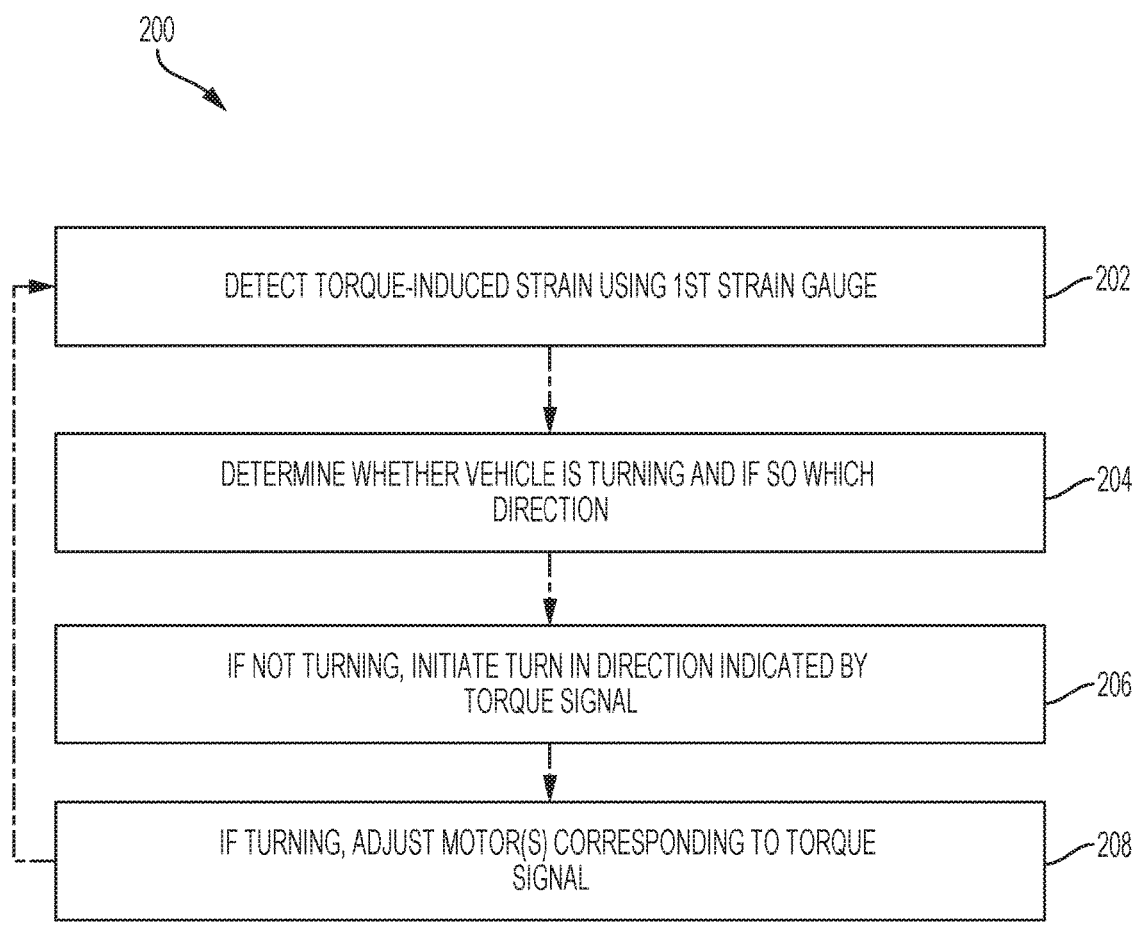
FIG. 11 is a flow chart depicting steps of an illustrative method for controlling vehicle turn characteristics in response to twist strain.
Figure 12:
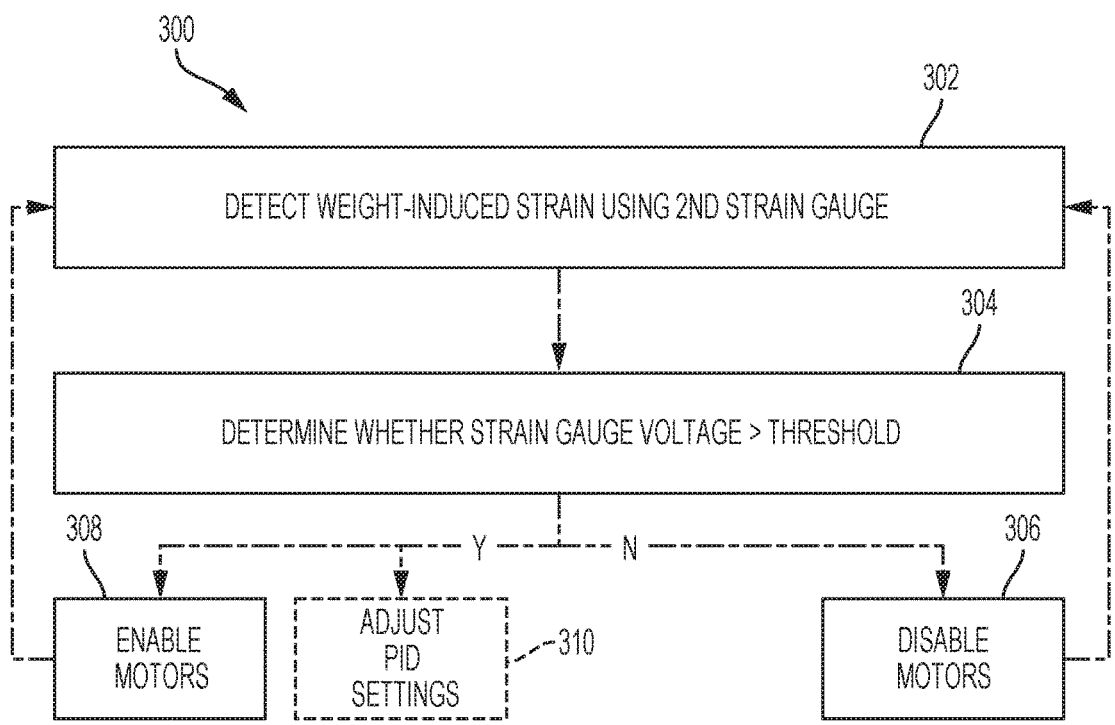
FIG. 12 is a flow chart depicting steps of an illustrative method for rider detection in accordance with aspects of the present disclosure.

Turning to FIGS. 11 and 12, examples of a turn control method and a rider detection method will now be described. Each method may be carried out by any suitable controls of vehicle 100 such as motor controller circuit 148 or other suitable control systems (e.g., as described below). FIGS. 11 and 12 are flowcharts illustrating steps performed in some examples, and may not recite the complete process or all steps of the method.

The multiple steps depicted may be performed in conjunction with vehicles and sensing and control systems according to aspects of the present disclosure. Although various steps of the methods are described below and depicted in FIGS. 11 and 12, the steps need not necessarily all be performed, and in some cases may be performed in a different order than the order shown FIG. 11 depicts steps of a method 200 for controlling the turning of vehicle 100 based on strain detected by twist-induced strain gauge 136. Accordingly, step 202 includes detecting torque-induced strain using a first strain gauge. As described above, the first strain gauge may be oriented at approximately or exactly 45-degrees with respect to a long axis of the vehicle (i.e., also with respect to the centerline of the vehicle and/or a direction of travel). Step 204 includes determining whether the vehicle is already turning and, if so, in which direction. This may be achieved, for example, using a MEMS yaw gyro and/or by receiving information from the wheel motors regarding their relative rotational speeds.

Step 206 includes, if the vehicle is not turning, initiating a turn of the vehicle in the direction indicated by the torque signal measured by the first strain gauge. For example, torque may be applied to one or both wheel motors, in differing amounts, to cause the vehicle to turn. If the vehicle is already turning, step 208 includes adjusting the torque of one or both motors to affect the desired turn. For example, the torque of one wheel motor may be reduced or increased, depending on the speed of the turn already in progress. In some instances, the vehicle may be turning in a different direction than desired, in which case torque must be gradually transitioned to reverse the direction of the turn. As indicated in FIG. 11, this series of steps is a loop, such that rider-induced twisting of the vehicle frame is monitored and responded to on a continuous and/or continuing basis.

FIG. 12 depicts steps of a method 300 for controlling the motors of vehicle 100 based on weight-induced strain detected by strain gauge 144. Accordingly, step 302 includes detecting a weight-induced strain using a second strain gauge. As described above, the second strain gauge may be oriented at approximately or exactly 90-degrees with respect to a long axis of the vehicle (i.e., also with respect to the centerline of the vehicle and/or a direction of travel). Step 304 includes determining whether the detected strain (i.e., strain gauge voltage) is greater than a selected threshold. This prevents false positives and avoids unwanted responses from the system. In some examples, the threshold may be selected to exclude lightweight riders (e.g., children) from using the vehicle. If strain voltage is less than the threshold, step 306 includes disabling the motors of the vehicle. If strain voltage is higher than the threshold, step 308 includes enabling the motors and may also result in step 310, in which the PID settings of the balance and/or turn control system are automatically adjusted based on the weight of the rider, as described above.

B. Illustrative Control Systems and Methods

Figure 13:
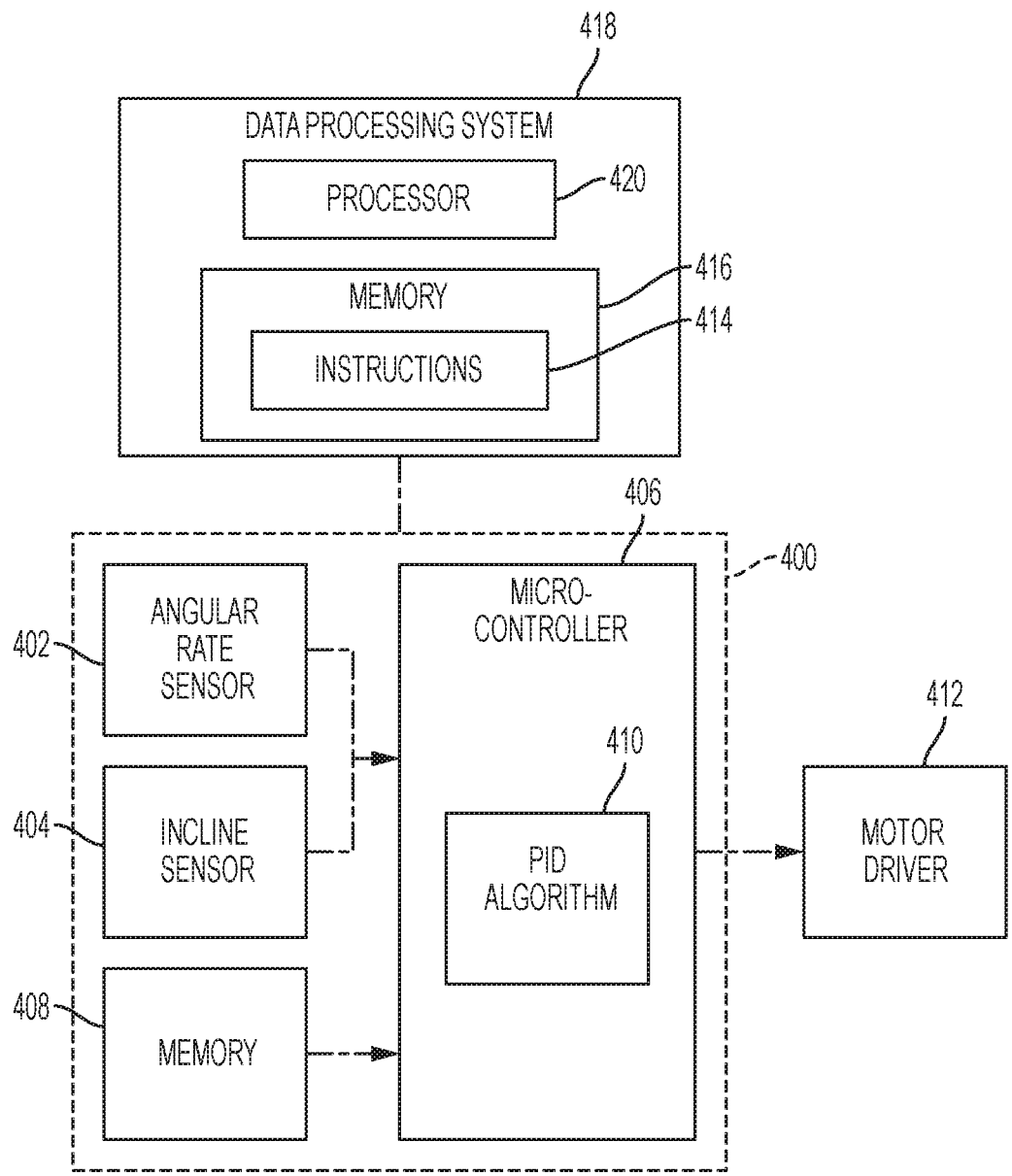
FIG. 13 is a block diagram depicting selected components in an illustrative control system in accordance with aspects of the present disclosure.
Figure 14:
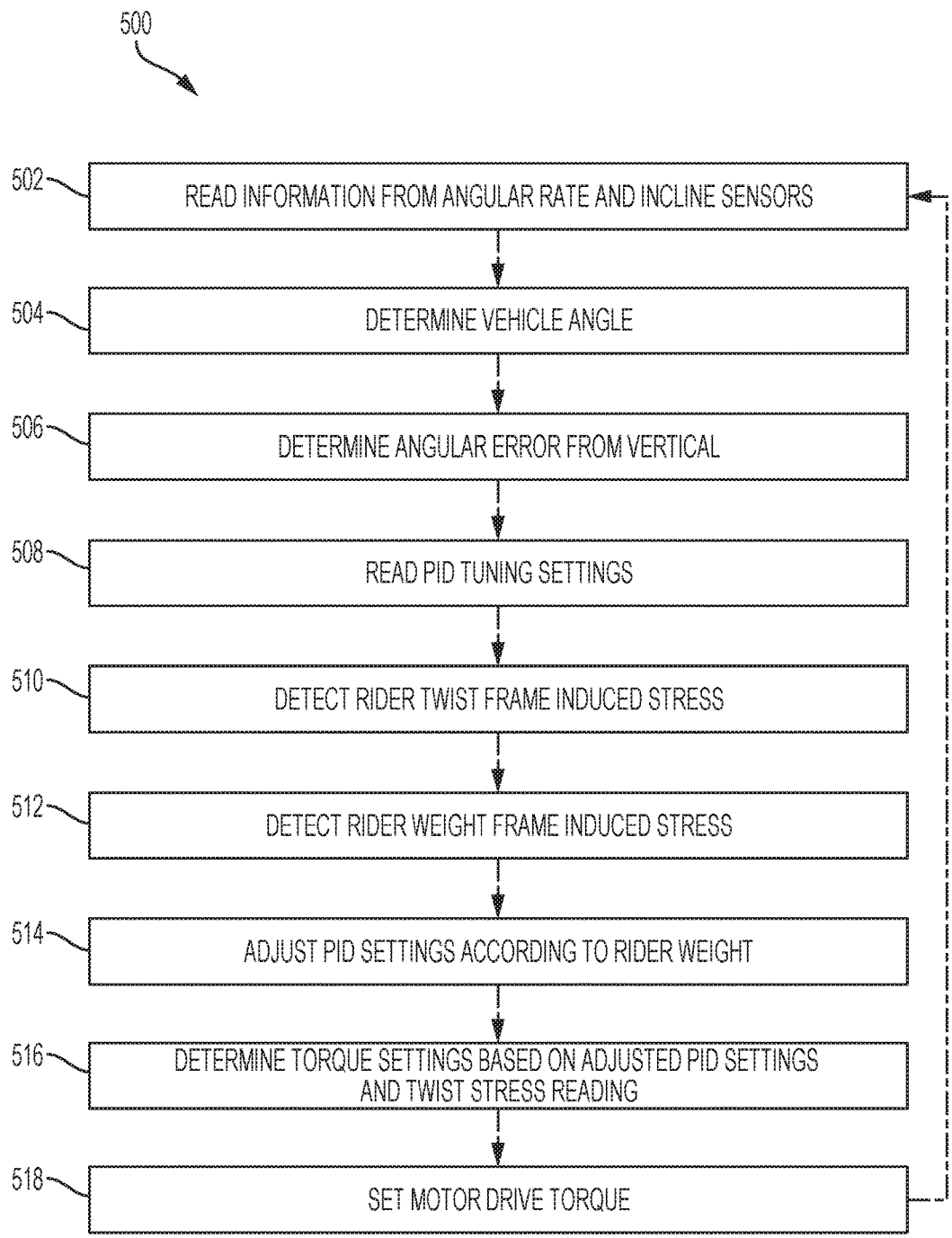
FIG. 14 is a flow chart depicting steps of an illustrative method for controlling motors of a self-balancing vehicle using a control system such as the one shown in FIG. 13.

As shown in FIGS. 13 and 14, this section describes an illustrative control system 400 suitable for use in self-balancing vehicles according to the present teachings (e.g., system 10 and/or vehicle 100), as well as related balance control and vehicle turning methods. Control system 400 may be an example of (or may include aspects of) motor controller circuit 148.

FIG. 13 is a schematic block diagram showing balance and turn control system 400. Control system 400 may include an angular rate sensor 402 (e.g., a three-axis MEMS gyro sensor integrated circuit (IC)), one or more incline sensors 404 (e.g., a three-axis MEMS accelerometer IC), a microcontroller or microprocessor 406, and a memory 408.

Microcontroller 406 may have sufficient computing power to receive sensor data and calculate the required torque needed to safely and comfortably balance the electric self-balancing vehicle. Microcontroller 406 receives data from angular rate sensors 402 and incline sensors 404, and determines the tilt of vehicle 100 in relation to gravity. Gravity is used here to denote a vertical vector or a vertical axis in relation to the earth. Tilt of vehicle 100 is used here to denote the angle between gravity and longitudinal axis of the vehicle in the plane defined by the forward and reverse direction of vehicle 100.

Angular rate sensor(s) 402 may include any suitable rate sensor configured to measure the rate of change of the incline of vehicle 100, such as a three-axis MEMS gyro rate sensor having a maximum of 300 degrees per second. Other components that generate a similar signal may be used. Angular rate sensor 402 of control system 400 is held in a fixed position in relation to frame 102, and provides the rate of angular movement of frame 102 to microcontroller 406. The range of rate output and sensitivity of the sensor(s) is configured to adequately provide accurate data while not saturating during normal use.

Incline sensor(s) 404 may include any suitable incline sensing device, such as a MEMS capacitive-type, three-axis accelerometer with a plus-or-minus two gravity range component. Other components that generate a similar signal may be used. Incline sensor 404 of control system 400 is fixed in relation to frame 102, and provides the inclination of frame 102 in relation to gravity.

Memory 408 may include any suitable digital storage device (e.g., a non-volatile memory, which does not lose data when turned off) and may store instructions and PID tuning parameters. Microcontroller 406 may use the PID parameters when executing instructions stored in memory 408 to implement a PID algorithm 410. The PID algorithm sends a control signal to motor drivers 412 located on controller board 132. The motor drivers direct the current or voltage sent from battery 134 to electric motors 122, 124. PID parameters may be automatically adjusted per the rider's weight, e.g., making them more aggressive with heavier riders.

Vehicle 100 may further include instructions 414 stored in a memory 416 of a data processing system 418 (e.g., a personal computer) having its own processor 420. Instructions 414 may be supplied to computer 418 as a download from a computer network (e.g., the Internet) or on a physical medium (e.g., on a portable memory storage device such as a thumb drive, CD, or DVD). Control system 400 may be configured to connect to computer 418, which may upload instructions 414 to vehicle 100. Instructions 414 and computer 418 may provide for modification of instructions or parameters stored in memory 408 of the balance control system. Control system 400 may connect to computer 418 through wired or wireless methods, e.g., by a data cable or by a wireless connection using radio frequency signals and protocols, or by other suitable wireless means.

FIG. 14 is a flow chart depicting steps in an illustrative method 500 for achieving balance control, acceleration, deceleration, turning, and stopping of a vehicle such as vehicle 100, using control system 400.

At step 502, microcontroller 406 reads angular rate sensors 402 and incline sensors 404. The current angle of vehicle 100 in relation to gravity is calculated, e.g., primarily using the data from angular rate sensor 402. The angular rate is retrieved at a set interval. Approximately 500 to 1400 times per second has been found to be satisfactory, but other intervals are suitable. The angular rate can be incorporated into the current incline angle in proportion to the time base to provide a very accurate and responsive current angle of vehicle 100. Although the angle calculation may be accurate and responsive, it may drift over time. This drift can be corrected by slowly incorporating the incline sensor's calculated tilt angle into the current angle of the vehicle, as explained below.

Incline sensor 404 data is read at a similar periodicity as the angular rate sensor 402. At step 504, all three axes of accelerometer-based incline sensor 404 are read. The three axes, referred to as X, Y, and Z, form a standard coordinate system. Z is defined here as the vertical direction, corresponding to gravity, with X in the left-right direction, and Y in the forward-back direction. One axis in the Y plane would be sufficient information to determine tilt angle. Two axes in the Y-Z plane would provide a more accurate tilt angle. Three axes can determine how much total centrifugal force, acceleration, deceleration, and gravity is being applied to incline sensor 404. The total combined accelerations of all three axes, while vehicle 100 is stationary, should be equal to one earth gravity (G). If more or less than one G is indicated, then external forces are being applied to vehicle 100. The total combined accelerations can be calculated with the following formula:

$$\sqrt{X^2+Y^2+Z^2}$$

The actual tilt angle relative to earth's gravity is averaged or damped over a period of time sufficient enough to filter out noise and outside (non-gravity) forces. Accelerometer data with a total acceleration of more or less than approximately one G will be discarded as inclusive of outside forces such as horizontal acceleration, horizontal deceleration, and centrifugal force. These outside forces would add error to the tilt calculation. Fore-aft tilt is calculated using the Y and Z axes as shown by the following formula:

$$\tan^{-1}(Y \div Z)$$

Fore-aft tilt is included in the current angle of vehicle 100 to overcome any drift contributed by angular rate sensor 402. At step 506, angular error with respect to vertical (i.e., relative to gravity) is calculated.

At step 508, the PID tuning parameters are retrieved. These PID tuning parameters are used in PID algorithm 410 to calculate the required torque settings to accelerate, decelerate, and/or balance vehicle 100 in relation to gravity.

A PID controller has three main elements: proportional control, integral control, and derivative control. These three elements are sufficient to create a responsive, accurate, and stable system. Proportional control (P) is tuned by the proportional gain (kP) parameter stored in memory 408. A proportional controller's output is the error signal multiplied by kP and is responsible for providing a responsive system. Integral control (I) is tuned by the integral gain (kI) parameter stored in memory 408. An integral controller's output is the sum of all preceding error signals multiplied by kI and is responsible for providing an accurate system. It is also necessary to have limits on the sum to limit oscillating of the system. Integral control may not be necessary in all embodiments, instead some embodiments may use a PD loop. Differential control (D) is tuned by the differential gain (kD) parameter stored in memory 408. A differential controller's output is the velocity of the error signal multiplied by kD and is responsible for providing a stable system. The output of the PID controller is the sum of all P, I, and D outputs. Use of the PID controller in this context should be readily apparent to those skilled in the art.

At step 510, the rider-induced frame twist is detected, e.g., as described above with respect to twist-sensing strain gauge 136. At step 512, the rider weight is detected, e.g., as described above with respect to rider detection strain gauge 144. At step 514 The PID settings are adjusted according to the rider's weight. At steps 514 and 516, the previously retrieved and adjusted PID settings are used in the algorithm to calculate and (at step 518) to set the required torque settings to drive the vehicle into a vertical position with respect to gravity, and to turn (yaw) the vehicle according to the rider's indicated intention. This control technique inherently allows the rider to lean toward the leading foot platform to accelerate the vehicle 100 or lean toward the trailing foot platform to decelerate or stop the vehicle while always maintaining vertical balance. Additionally, at step 516 the wheel rotation velocities are evaluated. If the faster wheel is significantly faster than the slower wheel, then torque is limited on the faster wheel to prevent excessive wheel spin (which may be due to less traction on the faster wheel).

In some examples, the frame may be hinged in the middle for ease of storing and transportation. The frame may fold perpendicularly to the longitudinal axis to make the folded vehicle as flat and compact as possible. The center platform hinge point may extend up when folded and also serve as a handle. The hinge may have a locking mechanism to prevent undesired hinge movement while riding.

In some examples, the turning torque applied to the wheels (e.g. the difference in the speed at which each wheel is driven) may be determined by the roll angle of the vehicle, in addition to or instead of by a twisting strain. For example, the motor controllers, based on an amount and direction of roll of the platform, may apply a differential torque to the motors, effecting a turn. For example, even when the vehicle is not moving forward, the rider can roll it to one side indicating a desired yaw turn, the controller being configured to then apply differential torque to the motors. The roll angle may be measured by the MEMS sensors and/or by additional strain gauges located in areas strained separately by each first and second wheel.

C. Additional Examples and Illustrative Combinations

This section describes additional aspects and features of a self-balancing vehicle which uses strain gauges to detect rider-induced strain, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A self-balancing electric vehicle, comprising:
a platform including a first foot placement section and a second foot placement section coupled to the first foot placement section, the first and second foot placement sections each configured to receive a left or right foot of a rider oriented generally perpendicular to a longitudinal axis of the platform;
a first wheel and a second wheel coupled to the platform generally between the first and second foot placement sections, the first and second wheels sharing a common axis of rotation oriented perpendicular to the longitudinal axis of the platform;
a first motor assembly mounted to the platform and configured to rotate the first wheel, and a second motor assembly mounted to the platform and configured to rotate the second wheel, wherein the first and second motor assemblies are configured to propel the electric vehicle;
an orientation sensor coupled to the platform and configured to sense an orientation of the platform;
a first strain gauge coupled to the platform and configured to sense a twisting strain in the platform induced by unbalanced forces exerted upon the first and second foot placement sections; and
one or more motor controllers configured to cause the first and second motor assemblies to propel the electric vehicle based on platform orientation information measured by the orientation sensor and to turn the electric vehicle by driving the first and second wheels differentially in response to twisting strain information measured by the first strain gauge.

A1. The vehicle of A0, further comprising a second strain gauge coupled to the platform and configured to sense a strain in the platform induced by a weight of the rider.

A2. The vehicle of A1, wherein the one or more controllers are further configured to cause the first and second motor assemblies to propel the electric vehicle based both on the platform orientation information and on rider presence information corresponding to an output of the second strain gauge.

A3. The vehicle of A1, wherein the first and second strain gauges are each disposed between the first foot placement section and the second foot placement section.

A4. The vehicle of A1, wherein the one or more motor controllers are configured to activate the first and second drive motor assemblies when the second strain gauge output exceeds a selected threshold, and to deactivate the first and second drive motors when the second strain gauge output is less than the selected threshold.

A5. The vehicle of A1, wherein the one or more motor controllers are configured such that driving the first and second wheels differentially in response to the twisting strain information comprises causing a difference between speeds of the first and second wheels to be proportional to a magnitude of the strain sensed by the second strain gauge.

A6. The vehicle of A0, wherein a difference between respective speeds of the first and second wheels is limited to a selected percentage.

A7. The vehicle of A0, wherein the one or more motor controllers are configured to cause the first and second drive motor assemblies to drive the wheels toward self-balancing the platform.

A8. The vehicle of A0, further comprising a first suspension element coupling the first wheel to the platform, and a second suspension element coupling the second wheel to the platform.

A9. The vehicle of A8, wherein the first and second suspension elements each comprise a spring steel member.

A10. The vehicle of A0, wherein the one or more motor controllers are configured to drive the wheels differentially to cause the vehicle to turn in response both (a) to the twisting strain and (b) to a selectable ride characteristic setting.

A11. The vehicle of A0, wherein the first strain gauge is mounted diagonally with respect to the longitudinal axis of the platform.

A12. The vehicle of A0, wherein each of the first and second motor assemblies comprises a hub motor.

A13. The vehicle of A0, wherein the first wheel and the second wheel are spaced apart across a width of the platform.

A14. The vehicle of A0, wherein the first wheel and the second wheel are independently coupled to the platform by respective first and second axles.

A15. The vehicle of A14, wherein each of the first and second axles is coupled to the platform by a respective suspension element.

A16. The vehicle of A15, wherein each of the suspension elements comprises a spring steel member.

B0. A self-balancing electric vehicle, comprising:
a platform including a first foot placement section rigidly coupled to a second foot placement section, each of the foot placement sections configured to receive a left or right foot of a rider oriented generally perpendicular to a longitudinal axis of the platform;
a pair of coaxial wheels coupled to the platform, each wheel driven by a respective motor assembly to propel the vehicle;
an orientation sensor coupled to the platform and configured to sense a tilting orientation of the platform about a tilt axis oriented perpendicular to the longitudinal axis of the platform;
a first strain gauge coupled to the platform and configured to sense a twisting strain in the platform induced by unbalanced forces exerted upon the first and second foot placement sections; and
one or more motor controllers configured to cause the motor assemblies to propel the electric vehicle based on platform tilt information measured by the orientation sensor and to turn the electric vehicle by driving each of the wheels independently in response to twisting strain information measured by the first strain gauge.

B1. The vehicle of B0, wherein the first strain gauge is coupled to the platform at an approximately 45-degree angle with respect to the longitudinal axis.

B2. The vehicle of B0, further comprising a rider detection system configured to detect a presence of the rider based on a second strain gauge coupled to the platform and configured to detect a weight of the rider.

B3. The vehicle of B2, wherein driving each of the wheels independently includes driving the wheels at different respective speeds.

B4. The vehicle of B3, wherein a magnitude of the difference between the respective speeds of the wheels is based on the weight of the rider.

B5. The vehicle of B0, wherein each of the wheels is coupled to the platform by a respective axle.

B6. The vehicle of B5, wherein each of the axles is coupled to the platform by a respective suspension element.

B7. The vehicle of B6, wherein each of the suspension elements comprises a spring steel member.

B8. The vehicle of B0, wherein the wheels are disposed generally between the first and second foot placement sections and share a common axis of rotation oriented perpendicular to the longitudinal axis of the platform.

B9. The vehicle of B8, wherein the wheels are spaced apart across a width of the platform.

C0. In some examples, a self-balancing electric skateboard may include: a board including first and second deck portions coupled together and each configured to receive a left or right foot of a rider oriented generally perpendicular to a longitudinal axis of the board; two (or multiple) motors and wheels disposed between the first and second deck portions configured to propel the electric skateboard, wherein the first and second wheels share a generally common axis of rotation perpendicular to the longitudinal axis of the skateboard; suspensions coupled between the wheel assemblies and the board which yield to maintain traction when the skateboard is leaning and rolling; a balance position sensor attached to the board and configured to sense inclination of the board; a first strain gauge attached to the board and configured to sense twisting strain in the board induced by imbalanced forces exerted upon the first and second foot placement deck sections; a second strain gauge attached to the board and configured to sense strain in the board corresponding to rider weight and induced by forces exerted upon the first and second foot placement deck sections: a first drive motor configured to drive the first wheel, and a second drive motor configured to drive the second wheel, wherein the drive motors are configured to drive the wheels toward self-balancing the board in response to an inclination of the board sensed by the balance position sensor, and to drive the wheels differentially to cause the vehicle to turn in response to a twisting strain sensed by the first strain gauge and configured to drive the wheels in unison to cause the vehicle to move linearly in response to balanced forces on the first and second foot placement sections and are only (or variably) activated by the second strain gauge sensing the rider's weight. A traction sensing controller may be configured to sense the wheel speeds and adjust both drive motors' torque to keep the wheel rotational velocities relatively similar, especially in situations when one drive wheel has more traction compared to the other.

Advantages, Features, Benefits

The different embodiments and examples of the self-balancing vehicles described herein provide several advantages over known solutions. For example, illustrative embodiments described herein allow an intuitive and simple way to detect the rider position and how it indicates a desired turn.

Additionally, and among other benefits, illustrative embodiments described herein have more than one motor and wheel between the foot platforms, allowing the vehicle to turn in place or "yaw in place," without the need for forward or reverse velocities, by applying differential motor torques.

Additionally, and among other benefits, illustrative embodiments described herein have suspension elements that provide a smoother ride by yielding over obstacles on the vehicle support surface. Moreover, the suspension elements allow a rolled turn: keeping the wheels parallel yet rolled inherently turns the vehicle when moving forward; and allowing both wheels to stay in contact with the ground creates increased traction.

Additionally, and among other benefits, illustrative embodiments and examples described herein allow the manufacture of a simple, reliable, stronger, cost-effective, and customizable vehicle without the complexity of known rider detection switches.

Additionally, and among other benefits, illustrative embodiments and examples described herein facilitate automatic implementation of a softer control for lightweight riders, and a stronger, more aggressive control for heavier riders, thereby greatly adding to the safety of the vehicle.

Additionally, and among other benefits, illustrative embodiments and examples described herein include a strain gauge system that is cheaper, simpler, more reliable, smaller, lighter and/or more configurable than known systems.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A self-balancing electric vehicle, comprising:
a platform including a first foot placement section and a second foot placement section coupled to the first foot placement section, the first and second foot placement sections each configured to receive a left or right foot of a rider oriented generally perpendicular to a longitudinal axis of the platform;
a first wheel and a second wheel coupled to the platform generally between the first and second foot placement sections, the first and second wheels sharing a common axis of rotation oriented perpendicular to the longitudinal axis of the platform;
a first motor assembly mounted to the platform and configured to rotate the first wheel, and a second motor assembly mounted to the platform and configured to rotate the second wheel, wherein the first and second motor assemblies are configured to propel the electric vehicle;
an orientation sensor coupled to the platform and configured to sense an orientation of the platform;
a first strain gauge coupled to the platform and configured to sense a twisting strain in the platform induced by unbalanced forces exerted upon the first and second foot placement sections;
a second strain gauge coupled to the platform and configured to sense a strain in the platform induced by a weight of the rider; and
one or more motor controllers configured to cause the first and second motor assemblies to propel the electric vehicle based on platform orientation information measured by the orientation sensor and to turn the electric vehicle by driving the first and second wheels differentially in response to twisting strain information measured by the first strain gauge;
wherein the first and second strain gauges are each disposed between the first foot placement section and the second foot placement section.

2. The vehicle of claim 1, wherein the one or more controllers are further configured to cause the first and second motor assemblies to propel the electric vehicle based both on the platform orientation information and on rider presence information corresponding to an output of the second strain gauge.

3. The vehicle of claim 1, wherein the one or more motor controllers are configured to activate the first and second drive motor assemblies when an output of the second strain gauge exceeds a selected threshold, and to deactivate the first and second drive motor assemblies when the output of the second strain gauge is less than the selected threshold.

4. The vehicle of claim 1, wherein the one or more motor controllers are configured such that driving the first and second wheels differentially in response to the twisting strain information comprises causing a difference between speeds of the first and second wheels to be proportional to a magnitude of the strain sensed by the second strain gauge.

5. The vehicle of claim 1, wherein a difference between respective speeds of the first and second wheels is limited to a selected percentage.

6. The vehicle of claim 1, wherein the one or more motor controllers are configured to cause the first and second drive motor assemblies to drive the wheels toward self-balancing the platform.

7. The vehicle of claim 1, further comprising a first suspension element coupling the first wheel to the platform, and a second suspension element coupling the second wheel to the platform.

8. The vehicle of claim 7, wherein the first and second suspension elements each comprise a spring steel member.

9. The vehicle of claim 1, wherein the one or more motor controllers are configured to drive the wheels differentially to cause the vehicle to turn in response both (a) to the twisting strain and (b) to a selectable ride characteristic setting.

10. The vehicle of claim 1, wherein the first strain gauge is mounted diagonally with respect to the longitudinal axis of the platform.

11. The vehicle of claim 1, wherein each of the first and second motor assemblies comprises a hub motor.

12. The vehicle of claim 1, wherein the first wheel and the second wheel are spaced apart across a width of the platform.

13. The vehicle of claim 1, wherein the first wheel and the second wheel are independently coupled to the platform by respective first and second axles.

14. A self-balancing electric vehicle, comprising:
a platform including a first foot placement section rigidly coupled to a second foot placement section, each of the foot placement sections configured to receive a left or right foot of a rider oriented generally perpendicular to a longitudinal axis of the platform;
a pair of coaxial wheels coupled to the platform, each wheel driven by a respective motor assembly to propel the vehicle;
an orientation sensor coupled to the platform and configured to sense a tilting orientation of the platform about a tilt axis oriented perpendicular to the longitudinal axis of the platform;
a first strain gauge coupled to the platform and configured to sense a twisting strain in the platform induced by unbalanced forces exerted upon the first and second foot placement sections;
a rider detection system configured to detect a presence of the rider based on a second strain gauge coupled to the platform and configured to detect a weight of the rider; and
one or more motor controllers configured to cause the motor assemblies to propel the electric vehicle based on platform tilt information measured by the orientation sensor and to turn the electric vehicle by driving each of the wheels independently in response to twisting strain information measured by the first strain gauge;
wherein the first and second strain gauges are each disposed between the first foot placement section and the second foot placement section.

15. The vehicle of claim 14, wherein the first strain gauge is coupled to the platform at an approximately 45-degree angle with respect to the longitudinal axis.

16. The vehicle of claim 14, wherein driving each of the wheels independently includes driving the wheels at different respective speeds.

17. The vehicle of claim 16, wherein a magnitude of the difference between the respective speeds of the wheels is based on the weight of the rider.

18. The vehicle of claim 14, wherein each of the wheels is coupled to the platform by a respective axle.

19. The vehicle of claim 18, wherein each of the axles is coupled to the platform by a respective suspension element.

20. The vehicle of claim 19, wherein each of the suspension elements comprises a spring steel member.

21. The vehicle of claim 14, wherein the wheels are disposed generally between the first and second foot placement sections and share a common axis of rotation oriented perpendicular to the longitudinal axis of the platform.

22. The vehicle of claim 21, wherein the wheels are spaced apart across a width of the platform.

* * * * *